United States Patent
Huang et al.

(10) Patent No.: US 12,405,986 B2
(45) Date of Patent: Sep. 2, 2025

(54) EFFICIENT CONTENT EXTRACTION FROM UNSTRUCTURED DIALOG TEXT

(71) Applicant: The Board of Trustees of the University of Illinois, Urbana, IL (US)

(72) Inventors: Yun Huang, Champaign, IL (US); Yiren Liu, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 18/627,097

(22) Filed: Apr. 4, 2024

(65) Prior Publication Data

US 2024/0338398 A1    Oct. 10, 2024

Related U.S. Application Data

(60) Provisional application No. 63/457,292, filed on Apr. 5, 2023.

(51) Int. Cl.
G06F 7/00 (2006.01)
G06F 16/334 (2025.01)
(Continued)

(52) U.S. Cl.
CPC ........ G06F 16/337 (2019.01); G06F 16/3344 (2019.01); G06N 20/00 (2019.01)

(58) Field of Classification Search
CPC ............... G06F 16/337; G06F 16/3344; G06F 16/3329; G06F 16/313; G06F 16/35;
(Continued)

(56) References Cited

U.S. PATENT DOCUMENTS 10,474,673 B2    11/2019    Vora et al.
10,817,667 B2    10/2020    Yi et al.
(Continued)

OTHER PUBLICATIONS

Abokhodair, N., Yoo, D., & McDonald, D. W. (2015). Dissecting a social botnet: Growth, content and infuence in Twitter. In Proceedings of the 18th ACM conference on computer supported cooperative work & social computing (pp. 839-851).
(Continued)

*Primary Examiner* — Mohammad A Sana
(74) *Attorney, Agent, or Firm* — McDonnell Boehnen Hulbert & Berghoff LLP

(57) ABSTRACT

Systems and methods are provided to automate dialogs with community members providing reports of public safety events (e.g., crimes, medical emergencies, natural disasters) and to extract therefrom information to describe the particulars of such events across a wide range of possible event types. This includes using a first model to identify, from the community member's dialog text, a type for the incident being reported. This identification is then used to condition a second model to extract, from the community member's dialog text, one or more pieces of information relevant to the identified incident type (e.g., location of the incident, a description of a perpetrator of a crime, a description of a weapon used by the perpetrator, a description of a victim of the incident). The model can then output a subsequent response and/or a dialog tree or other expert system can select a pre-programmed response.

20 Claims, 5 Drawing Sheets

(51) Int. Cl.
  *G06F 16/335* (2019.01)
  *G06N 20/00* (2019.01)
(58) Field of Classification Search
  CPC .. G06F 16/2237; G06F 16/2247; G06F 16/56;
       G06F 16/285; G06F 16/243; G06F
       16/248; G06N 20/00; G06N 20/20; G06N
       5/01; G06N 5/043; G06N 5/02
  See application file for complete search history.

(56) References Cited

U.S. PATENT DOCUMENTS

| | | | |
|---|---|---|---|
| 11,366,857 | B2 | 6/2022 | Rodriquez et al. |
| 12,014,428 | B1* | 6/2024 | Turner ................. G06F 16/909 |
| 2019/0138595 | A1 | 5/2019 | Galitsky |
| 2019/0361951 | A1* | 11/2019 | Jayavelu ............. G06F 16/9538 |
| 2021/0224676 | A1* | 7/2021 | Arzani ................ G06F 11/3006 |
| 2021/0266345 | A1* | 8/2021 | Chen ................... H04L 63/1425 |
| 2024/0037464 | A1* | 2/2024 | Goswami ....... G06Q 10/063112 |
| 2025/0111248 | A1* | 4/2025 | Rao ........................ G06N 5/022 |

OTHER PUBLICATIONS

Adam, M., Wessel, M., & Benlian, A. (2020). AI-based chatbots in customer service and their effects on user compliance. Electronic Markets, 1-19.

Adamopoulou, E., & Moussiades, L. (2020). An overview of chatbot technology. In IFIP International Conference on Artifcial Intelligence Applications and Innovations (pp. 373-383).

Adamopoulou, E., & Moussiades, L. (2020). Chatbots: History, technology, and applications. Machine Learning with Applications, 2, 100006.

Ahmed, S. I., Jackson, S. J., Ahmed, N., Ferdous, H. S., Rifat, M. R., Rizvi, A. S. M., . . . & Mansur, R. S. (2014). Protibadi: A platform for fighting sexual harassment in urban Bangladesh. In Proceedings of the SIGCHI Conference on Human Factors in Computing Systems. 2695-2704.

Ai, H., Kumar, R., Nguyen, D., Nagasunder, A., & Rosé, C. P. (2010). Exploring the effectiveness of social capabilities and goal alignment in computer supported collaborative learning. In International Conference on Intelligent Tutoring Systems (pp. 134-143).

Alameda Police Department. (2020). Dispatch Training Manual. Retrieved from https://www.alamedaca.gov/files/assets/public/departments/alameda/police/dispatch-training-manual-060820.pdf.

Alarid, L. F., & Novak, K. J. (2008). Citizens' views on using alternate reporting methods in policing. Criminal Justice Policy Review, 19(1), 25-39.

Allnock, D., & Atkinson, R. (2019). 'Snitches get stitches': School-specific barriers to victim disclosure and peer reporting of sexual harm committed by young people in school contexts. Child Abuse & Neglect, 89, 7-17.

Alpers, B. S., Cornn, K., Feitzinger, L. E., Khaliq, U., Park, S. Y., Beigi, B., . . . & Aslan, H. (2020). Capturing Passenger Experience in a RideSharing Autonomous Vehicle: The Role of Digital Assistants in User Interface Design. In 12th International Conference on Automotive User Interfaces and Interactive Vehicular Applications. 83-93.

Amershi, S., Weld, D., Vorvoreanu, M., Fourney, A., Nushi, B., Collisson, P., . . . & Bennett, P. N. (2019). Guidelines for human-AI interaction. In Proceedings of the 2019 chi conference on human factors in computing systems (pp. 1-13).

Anabuki, M., Kakuta, H., Yamamoto, H., & Tamura, H. (2000). Welbo: An embodied conversational agent living in mixed reality space. In CHI'00 extended abstracts on Human factors in computing systems (pp. 10-11).

Ashktorab, Z., Jain, M., Liao, Q. V., & Weisz, J. D. (2019). Resilient chatbots: Repair strategy preferences for conversational breakdowns. In Proceedings of the 2019 CHI Conference on Human Factors in Computing Systems (pp. 1-12).

Avula, S., Chadwick, G., Arguello, J., & Capra, R. (2018). Searchbots: User engagement with chatbots during collaborative search. In Proceedings of the 2018 conference on human information interaction & retrieval (pp. 52-61).

Bagroy, S., Kumaraguru, P., & De Choudhury, M. (2017). A social media based index of mental well-being in college campuses. In Proceedings of the 2017 CHI Conference on Human factors in Computing Systems. 1634-1646.

Barsade, S. G. (2002). The ripple effect: Emotional contagion and its infuence on group behavior. Administrative science quarterly, 47(4), 644-675.

Baumer, E. P. (2002). Neighborhood disadvantage and police notification by victims of violence. Criminology, 40(3), 579-616.

Bawa, A., Khadpe, P., Joshi, P., Bali, K., & Choudhury, M. (2020). Do Multilingual Users Prefer Chat-bots that Code-mix? Let's Nudge and Find Out! Proceedings of the ACM on Human-Computer Interaction, 4(CSCW1), 1-23.

Benke, I., Knierim, M. T., & Maedche, A. (2020). Chatbotbased emotion management for distributed teams: A participatory design study. Proceedings of the ACM on Human-Computer Interaction, 4(CSCW2), 1-30.

Benne, K. D., & Sheats, P. (1948). Functional roles of group members. Journal of social issues, 4(2), 41-49.

Beuth, J. L., Rosé, C. P., & Kumar, R. (2010). Software agent-monitored tutorials enabling collaborative learning in computer-aided design and analysis. In ASME International Mechanical Engineering Congress and Exposition, vol. 44434 (pp. 339-346).

Bickmore, T. W., Caruso, L., & Clough-Gorr, K. (2005). Acceptance and usability of a relational agent interface by urban older adults. In CHI'05 extended abstracts on Human factors in computing systems (pp. 1212-1215).

Bickmore, T. W., Mitchell, S. E., Jack, B. W., PaascheOrlow, M. K., Pfeifer, L. M., & O'Donnell, J. (2010). Response to a relational agent by hospital patients with depressive symptoms. Interacting with computers, 22(4), 289-298.

Bickmore, T. W., Pfeifer, L. M., & Jack, B. W. (2009). Taking the time to care: empowering low health literacy hospital patients with virtual nurse agents. In Proceedings of the SIGCHI conference on human factors in computing systems (pp. 1265-1274).

Biddle, B. J. (1986). Recent developments in role theory. Annual review of sociology, 12(1), 67-92.

Biswas, P. (2006). A fexible approach to natural language generation for disabled children. In Proceedings of the COLING/ACL 2006 Student Research Workshop (pp. 1-6).

Bittner, E., Oeste-Reiß, S., & Leimeister, J. M. (2019). Where is the bot in our team? Toward a taxonomy of design option combinations for conversational agents in collaborative work. In Proceedings of the 52nd Hawaii international conference on system sciences.

Blom, J., Viswanathan, D., Spasojevic, M., Go, J., Acharya, K., & Ahonius, R. (2010). Fear and the city: role of mobile services in harnessing safety and security in urban use contexts. In Proceedings of the SIGCHI Conference on Human Factors in Computing Systems. 1841-1850.

Bohus, D., & Horvitz, E. (2009). Dialog in the open world: platform and applications. In Proceedings of the 2009 international conference on Multimodal interfaces (pp. 31-38).

Bohus, D., & Horvitz, E. (2009). Learning to predict engagement with a spoken dialog system in open-world settings. In Proceedings of the SIGDIAL 2009 Conference (pp. 244-252).

Bohus, D., & Horvitz, E. (2010). Facilitating multiparty dialog with gaze, gesture, and speech. In International Conference on Multimodal Interfaces and the Workshop on Machine Learning for Multimodal Interaction (pp. 1-8).

Bohus, D., & Horvitz, E. (2011). Multiparty turn taking in situated dialog: Study, lessons, and directions. In Proceedings of the SIGDIAL 2011 Conference (pp. 98-109).

Bonfert, M., Spliethover, M., Arzaroli, R., Lange, M., Hanci, M., & Porzel, R. (2018). If you ask nicely: a digital assistant rebuking impolite voice commands. In proceedings of the 20th ACM international conference on multimodal interaction (pp. 95-102).

Borsato, M., & Peruzzini, M. (2015). Collaborative engineering. In Concurrent engineering in the 21st century (pp. 165-196).

(56) References Cited

OTHER PUBLICATIONS

Bowles, R., Reyes, M. G., & Garoupa, N. (2009). Crime reporting decisions and the costs of crime. European journal on criminal policy and research, 15(4), 365-377.

Braun, V., & Clarke, V. (2006). Using thematic analysis in psychology. Qualitative research in psychology, 3(2), 77-101.

Briggs, R. O., Kolfschoten, G. L., & Vreede, G. J. de. (2005). Toward a theoretical model of consensus building. AMCIS 2005 Proceedings, 12.

Budzianowski, P., Wen, T.-H., Tseng, B.-H., Casanueva, I., Ultes, S., Ramadan, O., & Gašic, M. (2018). MultiWOZ—A Large-Scale Multi-Domain Wizard-of-Oz Dataset' for Task-Oriented Dialogue Modelling. arXiv preprint arXiv:1810.00278.

Burden, K., & Kearney, M. (2016). Conceptualising authentic mobile learning. In Mobile learning design (pp. 27-42).

Cai, W., Jin, Y., & Chen, L. (2021). Critiquing for Music Exploration in Conversational Recommender Systems. In 26th International Conference on Intelligent User Interfaces (pp. 480-490).

Campbell, R., Sanders, T., Scoular, J., Pitcher, J., & Cunningham, S. (2019). Risking safety and rights: online sex work, crimes and 'blended safety repertoires'. The British journal of sociology, 70(4), 1539-1560.

Car, L. T., Dhinagaran, D. A., Kyaw, B. M., Kowatsch, T., Joty, S., Theng, Y.-L., . . . & Atun, R. (2020). Conversational agents in health care: scoping review and conceptual analysis. Journal of medical Internet research, 22(8), e17158.

Casas, J., Tricot, M. O., Khaled, O. A., Mugellini, E., & Cudre-Mauroux, P. (2020). Trends & Methods in Chatbot Evaluation. In Companion Publication of the 2020 International Conference on Multimodal Interaction (pp. 280-286).

Casillo, M., Colace, F., Fabbri, L., Lombardi, M., Romano, A., & Santaniello, D. (2020). Chatbot in industry 4.0: An approach for training new employees. In 2020 IEEE International Conference on Teaching, Assessment, and Learning for Engineering (TALE). IEEE, 371-376.

Cassell, J. (2000). Embodied conversational interface agents. Commun. ACM, 43(4), 70-78.

CatapultEMS. (2022). WeTip Anonymous Reporting System. Retrieved from https://www.wetip.com/.

Cavazos Quero, L., Bartolomé, J. I., Lee, D., Lee, Y., Lee, S., & Cho, J. (2019). Jido: a conversational tactile map for blind people. In the 21st International ACM SIGACCESS Conference on Computers and Accessibility (pp. 682-684).

Chai, J. Y., She, L., Fang, R., Ottarson, S., Littley, C., Liu, C., & Hanson, K. (2014). Collaborative efort towards common ground in situated human-robot dialogue. In 2014 9th ACM/IEEE International Conference on Human-Robot Interaction (HRI) (pp. 33-40).

Chai, J., Horvath, V., Kambhatla, N., Nicolov, N., & Stys-Budzikowska, M. (2001). A conversational interface for online shopping. In Proceedings of the First International Conference on Human Language Technology Research.

Chakraborty, A., Sarkar, R., Mrigen, A., & Ganguly, N. (2017). Tabloids in the era of social media? understanding the production and consumption of clickbaits in twitter. arXiv:1709.02957v1, Proceedings of the ACM on Human-Computer Interaction, 1(CSCW), 1-21.

Muresan, A., & Pohl, H. (2019). Chats with bots: Balancing imitation and engagement. In Extended Abstracts of the 2019 CHI Conference on Human Factors in Computing Systems (pp. 1-6).

Myers, S. L. (1980). Why are Crimes Underreported? What is the Crime Rate? Does it"Really" Matter? Social Science Quarterly, 61(1), 23-43.

Mygland, M. J., Schibbye, M., Pappas, I. O., & Vassilakopoulou, P. (2021). Afordances in human-chatbot interaction: a review of the literature. In Conference on e-Business, e-Services and e-Society (pp. 3-17).

Nabukenya, J., van Bommel, P., & Proper, H. A. (2009). A theory-driven design approach to collaborative policy making processes. In 2009 42nd Hawaii International Conference on System Sciences (pp. 1-10).

Nakanishi, H., Nakazawa, S., Ishida, T., Takanashi, K., & Isbister, K. (2003). Can software agents influence human relations? Balance theory in agent-mediated communities. In Proceedings of the second international joint conference on autonomous agents and multiagent systems (pp. 717-724).

Narain, J., Quach, T., Davey, M., Park, H. W., Breazeal, C., & Picard, R. (2020). Promoting wellbeing with Sunny, a chatbot that facilitates positive messages within social groups. In Extended Abstracts of the 2020 CHI Conference on Human Factors in Computing Systems (pp. 1-8).

Nass, C., Steuer, J., & Tauber, E. R. (1994). Computers are social actors. In Proceedings of the SIGCHI conference on Human factors in computing systems (pp. 72-78).

Neusteter, S. R., Mapolski, M., Khogali, M., & O'Toole, M. (2019). The 911 call processing system: A review of the literature as it relates to policing.

Nguyen, T. H., & Shirai, K. (2015). Topic modeling based sentiment analysis on social media for stock market prediction. In Proceedings of the 53rd Annual Meeting of the Association for Computational Linguistics and the 7th International Joint Conference on Natural Language Processing (vol. 1: Long Papers) (pp. 1354-1364).

Nunes, F., Verdezoto, N., Fitzpatrick, G., Kyng, M., Grönvall, E., & Storni, C. (2015). Self-care technologies in HCI: Trends, tensions, and opportunities. ACM Transactions on Computer-Human Interaction (TOCHI), 22(6), 1-45.

O'Dowd, A. (2006). Guarantee of anonymity leads to surge in reports of safety incidents. BMJ: British Medical Journal, 332(7534), 140.

Ochs, M., Libermann, N., Boidin, A., & Chaminade, T. (2017). Do you speak to a human or a virtual agent? automatic analysis of user's social cues during mediated communication. In Proceedings of the 19th ACM International Conference on Multimodal Interaction (pp. 197-205).

Otogi, S., Huang, H.-H., Hotta, R., & Kawagoe, K. (2013). Finding the timings for a guide agent to intervene-inter-user conversation in considering their gaze behaviors. In Proceedings of the 6th workshop on Eye gaze in intelligent human machine interaction: gaze in multimodal interaction (pp. 19-24).

Otogi, S., Huang, H.-H., Hotta, R., & Kawagoe, K. (2014). Analysis of personality traits for intervention scene detection in multi-user conversation. In Proceedings of the second international conference on Human-agent interaction (pp. 237-240).

Palen, L., & Dourish, P. (2003). Unpacking"privacy" for a networked world. In Proceedings of the SIGCHI conference on Human factors in computing systems (pp. 129-136).

Pamungkas, E. W. (2019). Emotionally-aware chatbots: A survey. arXiv preprint arXiv:1906.09774.

Paoletti, I. (2012). Operators managing callers' sense of urgency in calls to the medical emergency number. Pragmatics, 22(4), 671-695.

Park, G., & Pouchard, L. (2019). Scientific Literature Mining for Experiment Information in Materials Design. In 2019 New York Scientifc Data Summit (NYSDS). IEEE, 1-4.

Park, G., Rayz, J. T., & Pouchard, L. (2020). Figure descriptive text extraction using ontological representation. In The Thirty-Third International Flairs Conference.

Park, H., & Lee, J. (2020). Can a Conversational Agent Lower Sexual Violence Victims' Burden of Self-Disclosure ?. In Extended Abstracts of the 2020 CHI Conference on Human Factors in Computing Systems. 1-8.

Pecune, F., Chen, J., Matsuyama, Y., & Cassell, J. (2018). Field trial analysis of socially aware robot assistant. In Proceedings of the 17th international conference on autonomous agents and multiagent systems. 1241-1249.

Peng, Z., Kim, T., & Ma, X. (2019). GremoBot: Exploring emotion regulation in group chat. In Conference Companion Publication of the 2019 on Computer Supported Cooperative Work and Social Computing. 335-340.

Petronio, S. (2013). Brief status report on communication privacy management theory. Journal of Family Communication, 13(1), 6-14.

Petronio, S., & Durham, W. T. (2014). Communication Privacy Management Theory. Engaging Theories in Interpersonal Communication: Multiple Perspectives, 335.

(56) References Cited

OTHER PUBLICATIONS

Pigou, A. C., & Aslanbeigui, N. (2017). The economics of welfare. Routledge.

Pina, L. R., Gonzalez, C., Nieto, C., Roldan, W., Onofre, E., & Yip, J. C. (2018). How Latino children in the US engage in collaborative online information problem solving with their families. Proceedings of the ACM on Human-Computer Interaction, 2(CSCW), 1-26.

Pinelle, D., & Gutwin, C. (2000). A review of groupware evaluations. In Proceedings IEEE 9th International Workshops on Enabling Technologies: Infrastructure for Collaborative Enterprises (WET ICE 2000). IEEE, 86-91.

Prasad, A., Blagsvedt, S., Pochiraju, T., & Thies, I. M. (2019). Dara: A Chatbot to Help Indian Artists and Designers Discover International Opportunities. In Proceedings of the 2019 on Creativity and Cognition. 626-632.

Purington, A., Taft, J. G., Sannon, S., Bazarova, N. N., & Taylor, S. H. (2017). "Alexa is my new BFF" Social Roles, User Satisfaction, and Personification of the Amazon Echo. In Proceedings of the 2017 CHI conference extended abstracts on human factors in computing systems (pp. 2853-2859).

Raffel, C., Shazeer, N., Roberts, A., Lee, K., Narang, S., Matena, M., . . . & Liu, P. J. (2019). Exploring the limits of transfer learning with a unified text-to-text transformer. arXiv preprint arXiv:1910.10683.

Ralph, P., & Robbes, R. (2020). The ACM SIGSOFT Paper and Peer Review Quality Initiative: Status Report. ACM SIGSOFT Software Engineering Notes, 45(2), 17-18.

Rapp, A., Curti, L., & Boldi, A. (2021). The human side of humanchatbot interaction: A systematic literature review of ten years of research on text-based chatbots. International Journal of Human-Computer Studies, 102630.

Reaves, B. A. (2015). Campus law enforcement, Dec. 2011. US Department of Justice, Office of Justice Programs, Bureau of Justice.

Rehm, M. (2008). "She is just stupid"—Analyzing user-agent interactions in emotional game situations. Interacting with Computers, 20(3), 311-325.

Reig, S., Luria, M., Wang, J. Z., Oltman, D., Carter, E. J., Steinfeld, A., . . . & Zimmerman, J. (2020). Not Some Random Agent: Multi-person interaction with a personalizing service robot. In Proceedings of the 2020 ACM/IEEE International Conference on Human-Robot Interaction. 289-297.

Rheu, M., Shin, J. Y., Peng, W., & Huh-Yoo, J. (2021). Systematic review: Trust-building factors and implications for conversational agent design. International Journal of Human-Computer Interaction, 37(1), 81-96.

Ruan, S., He, J., Ying, R., Burkle, J., Hakim, D., Wang, A., . . . & He, J. (2020). Supporting children's math learning with feedback-augmented narrative technology. In Proceedings of the Interaction Design and Children Conference. 567-580.

Ruan, S., Jiang, L., Xu, J., Tham, B. J.-K., Qiu, Z., Zhu, Y., . . . & Landay, J. A. (2019). Quizbot: A dialogue-based adaptive learning system for factual knowledge. In Proceedings of the 2019 CHI Conference on Human Factors in Computing Systems. 1-13.

Sakpere, A. B., Kayem, A. V., & Ndlovu, T. (2015). A usable and secure crime reporting system for technology resource constrained context. In 2015 IEEE 29th International Conference on Advanced Information Networking and Applications Workshops (pp. 424-429). IEEE.

Samrose, S., Anbarasu, K., Joshi, A., & Mishra, T. (2020). Mitigating Boredom Using an Empathetic Conversational Agent. In Proceedings of the 20th ACM International Conference on Intelligent Virtual Agents. 1-8.

Sannon, S., Stoll, B., DiFranzo, D., Jung, M., & Bazarova, N. N. (2018). How personification and interactivity influence stress-related disclosures to conversational agents. In companion of the 2018 ACM conference on computer supported cooperative work and social computing. 285-288.

Santos, K.-A., Ong, E., & Resurreccion, R. (2020). Therapist vibe: children's expressions of their emotions through storytelling with a chatbot. In Proceedings of the Interaction Design and Children Conference. 483-494.

Saravia, E., Liu, H.- C.T., Huang, Y.-H., Wu, J., & Chen, Y.-S. (2018). Carer: Contextualized affect representations for emotion recognition. In Proceedings of the 2018 conference on empirical methods in natural language processing (pp. 3687-3697).

Savage, S., Monroy-Hernandez, A., & Hollerer, T. (2016). Botivist: Calling volunteers to action using online bots. In Proceedings of the 19th ACM Conference on Computer-Supported Cooperative Work & Social Computing. 813-822.

Schraagen, J. M., & van de Ven, J. (2011). Human factors aspects of ICT for crisis management. Cognition, Technology & Work, 13(3), 175-187.

Schulman, D., & Bickmore, T. (2009). Persuading users through counseling dialogue with a conversational agent. In Proceedings of the 4th international conference on persuasive technology. 1-8.

Sciuto, A., Saini, A., Forlizzi, J., & Hong, J. I. (2018). " Hey Alexa, What's Up?" A Mixed-Methods Studies of In-Home Conversational Agent Usage. In Proceedings of the 2018 Designing Interactive Systems Conference. 857-868.

Sebo, S. T., Traeger, M., Jung, M., & Scassellati, B. (2018). The ripple effects of vulnerability: The effects of a robot's vulnerable behavior on trust in human-robot teams. In Proceedings of the 2018 ACM/IEEE International Conference on Human-Robot Interaction. 178-186.

Seering, J., Flores, J. P., Savage, S., & Hammer, J. (2018). The social roles of bots: evaluating impact of bots on discussions in online communities. Proceedings of the ACM on Human-Computer Interaction, 2(CSCW), 1-29.

Seering, J., Luria, M., Kaufman, G., & Hammer, J. (2019). Beyond dyadic interactions: Considering chatbots as community members. In Proceedings of the 2019 CHI Conference on Human Factors in Computing Systems. 1-13.

Chang, H., Eshetu, Y., & Lemrow, C. (2021). Supervised Machine Learning and Deep Learning Classifcation Techniques to Identify Scholarly and Research Content. In 2021 Systems and Information Engineering Design Symposium (SIEDS) (pp. 1-6).

Chaudhuri, S., Kumar, R., Howley, I. K., & Rose, C. P. (2009). Engaging Collaborative Learners with Helping Agents. In AIED (pp. 365-372).

Chaves, A. P., & Gerosa, M. A. (2020). How Should my Chatbot Interact? A Survey on Social Characteristics in Human-Chatbot Interaction Design. International Journal of Human-Computer Interaction, 1-30.

Chynal, P., Falkowska, J., & Sobecki, J. (2018). Human-Human Interaction: A Neglected Field of Study ?. In International Conference on Intelligent Human Systems Integration (pp. 346-351).

Clark, L., Doyle, P., Garaialde, D., Gilmartin, E., Schlogl, S., Edlund, J., . . . & Cabral, J. (2019). The state of speech in HCI: Trends, themes and challenges. Interacting with Computers, 31(4), 349-371.

Clawson, J., Jorgensen, D., Frazier, A., Gardett, I., Scott, G., Hawkins, B., . . . & Olola, C. (2018). Litigation and Adverse Incidents in Emergency Dispatching. Annals of Emergency Dispatch & Response, 6, 1-12.

Cranshaw, J., Elwany, E., Newman, T., Kocielnik, R., Yu, B., Soni, S., . . . & Monroy-Hernández, A. (2017). Calendar. help: Designing a workflow-based scheduling agent with humans in the loop. In Proceedings of the 2017 CHI Conference on Human Factors in Computing Systems (pp. 2382-2393).

Cvijikj, I. P., Kadar, C., Ivan, B., & Te, Y.-F. (2015). Towards a crowdsourcing approach for crime prevention. In Adjunct Proceedings of the 2015 ACM International Joint Conference on Pervasive and Ubiquitous Computing and Proceedings of the 2015 ACM International Symposium on Wearable Computers. 1367-1372.

Dafoe, A. (2015). On technological determinism: a typology, scope conditions, and a mechanism. Science, Technology, & Human Values, 40(6), 1047-1076.

Dakof, G. A., & Taylor, S. E. (1990). Victims' perceptions of social support: What is helpful from whom? Journal of personality and social psychology, 58(1).

(56) References Cited

OTHER PUBLICATIONS

De Barcelos Silva, A., Gomes, M. M., Costa, C. A. da, Righi, R. da R., Barbosa, J. L. V., Pessin, G., . . . & Federizzi, G. (2020). Intelligent personal assistants: A systematic literature review. Expert Systems with Applications, 147, 113193.

Demberg, V., Winterboer, A., & Moore, J. D. (2011). A strategy for information presentation in spoken dialog systems. Computational Linguistics, 37(3), 489-539.

Dohsaka, K., Asai, R., Higashinaka, R., Minami, Y., & Maeda, E. (2009). Effects of conversational agents on human communication in thought-evoking multi-party dialogues. In Proceedings of the SIGDIAL 2009 Conference (pp. 217-224).

Donath, J. (2007). Signals, cues and meaning. Signals, Truth and Design.

Du, X., & Cardie, C. (2020). Event extraction by answering (almost) natural questions. arXiv preprint arXiv:2004.13625.

Dyke, G., Howley, I., Adamson, D., Kumar, R., & Rose, C. P. (2013). Towards academically productive talk supported by conversational agents. In Productive multivocality in the analysis of group interactions (pp. 459-476).

Ellcessor, E. (2019). Call if you can, text if you can't: A dismediation of US emergency communication infrastructure. International Journal of Communication, 13, 20.

Federal Communications Commission. (2022). Text to 911: What you Need to Know. Retrieved from https://www.fcc.gov/consumers/guides/what-you-need-know-about-text-911.

Feine, J., Gnewuch, U., Morana, S., & Maedche, A. (2019). A taxonomy of social cues for conversational agents. International Journal of Human-Computer Studies, 132, 138-161.

Feldman, H. K. (2021). Calming emotional 911 callers: Using redirection as a patient-focused directive in emergency medical calls. Language & Communication, 81, 81-92.

Følstad, A., & Brandtzæg, P. B. (2017). Chatbots and the new world of HCI. interactions, 24(4), 38-42.

Følstad, A., & Skjuve, M. (2019). Chatbots for customer service: user experience and motivation. In Proceedings of the 1st international conference on conversational user interfaces (pp. 1-9).

Følstad, A., Araujo, T., Law, E. L.-C., Brandtzaeg, P. B., Papadopoulos, S., Reis, L., . . . & Calleja-López, A. (2021). Future directions for chatbot research: an interdisciplinary research agenda. Computing, 1-24.

Følstad, A., Skjuve, M., & Brandtzæg, P. B. (2018). Different chatbots for different purposes: towards a typology of chatbots to understand interaction design. In International Conference on Internet Science (pp. 145-156).

Foster, M. E., Giuliani, M., & Knoll, A. (2009). Comparing objective and subjective measures of usability in a human-robot dialogue system. In Proceedings of the 47th Annual Meeting of the Association for Computational Linguistics and the 4th International Joint Conference on Natural Language Processing of the Asian Federation of Natural Language Processing (ACL-IJCNLP 2009).

Fox, J., & Gambino, A. (2021). Relationship Development with Humanoid Social Robots: Applying Interpersonal Theories to Human/Robot Interaction. Cyberpsychology, Behavior, and Social Networking.

Gao, J., Galley, M., & Li, L. (2018). Neural approaches to conversational ai. In the 41st International ACM Sigir Conference on Research & Development in Information Retrieval (pp. 1371-1374).

Gao, S., Sethi, A., Agarwal, S., Chung, T., & Hakkani-Tur, D. (2019). Dialog state tracking: A neural reading comprehension approach. arXiv preprint arXiv:1908.01946.

Garcia, A. C. (2015). 'Something really weird has happened': Losing the 'big picture'in emergency service calls. Journal of Pragmatics, 84, 102-120.

Goldstein, M. L. (2018). Next Generation 911: National 911 Program Could Strengthen Efforts to Assist States. Technical Report. United States Government Accountability Office, GAO-18-252, 8 pages.

Google Cloud. (2024). Contact center solutions. Retrieved from https://cloud.google.com/solutions/contact-center.

Goudriaan, H., Lynch, J. P., & Nieuwbeerta, P. (2004). Reporting to the police in western nations: A theoretical analysis of the effects of social context. Justice Quarterly, 21(4), 933-969.

Goudriaan, H., Wittebrood, K., & Nieuwbeerta, P. (2006). Neighbourhood characteristics and reporting crime: Effects of social cohesion, confidence in police effectiveness and socio-economic disadvantage. British journal of criminology, 46(4), 719-742.

Grace, R., & Sinor, S. (2021). How to text 911: A content analysis of text-to-911 public education information. In The 39th ACM International Conference on Design of Communication (pp. 135-141).

Gray, G. M., & Ropeik, D. P. (2002). Dealing with the dangers of fear: the role of risk communication. Health Affairs, 21(6), 106-116.

Griol, D., Carbó, J., & Molina, J. M. (2013). An automatic dialog simulation technique to develop and evaluate interactive conversational agents. Applied Artificial Intelligence, 27(9), 759-780.

Grolleman, J., van Dijk, B., Nijholt, A., & van Emst, A. (2006). Break the habit! designing an e-therapy intervention using a virtual coach in aid of smoking cessation. In International Conference on Persuasive Technology (pp. 133-141).

Gulz, A., Haake, M., & Silvervarg, A. (2011). Extending a teachable agent with a social conversation module-effects on student experiences and learning. In International conference on artificial intelligence in education (pp. 106-114).

Gurcan, F., & Cagiltay, N. E. (2020). Research trends on distance learning: a text mining-based literature review from 2008 to 2018. Interactive Learning Environments, 1-22.

Gurcan, F., Cagiltay, N. E., & Cagiltay, K. (2021). Mapping human-computer interaction research themes and trends from its existence to today: A topic modeling-based review of past 60 years. International Journal of Human-Computer Interaction, 37(3), 267-280.

Guzman, A. L. (2020). Ontological boundaries between humans and computers and the implications for human-machine communication. Human-Machine Communication, 1(1), 3.

Guzman, A. L., & Lewis, S. C. (2020). Artificial intelligence and communication: A Human-Machine Communication research agenda. New Media & Society, 22(1), 70-86.

Harvey, S. B., Modini, M., Joyce, S., Milligan-Saville, J. S., Tan, L., Mykletun, A., Bryant, R. A., Christensen, H., & Mitchell, P. B. (2017). Can work make you mentally ill? A systematic meta-review of work-related risk factors for common mental health problems. Occupational and environmental medicine, 74(4), 301-310.

Hossain, M. M., Sharmin, M., & Ahmed, S. (2018). Bangladesh emergency services: a mobile application to provide 911-like service in Bangladesh. In Proceedings of the 1st ACM SIGCAS Conference on Computing and Sustainable Societies (pp. 1-11).

Hughes, A. L., & Palen, L. (2012). The evolving role of the public information officer: An examination of social media in emergency management. Journal of Homeland Security and Emergency Management, 9(1).

Iriberri, A., Leroy, G., & Garrett, N. (2006). Reporting on-campus crime online: User intention to use. In Proceedings of the 39th Annual Hawaii International Conference on System Sciences (HICSS'06), vol. 4 (p. 82a).

Kale, M., & Rastogi, A. (2020). Template guided text generation for task-oriented dialogue. arXiv preprint arXiv:2004.15006.

Kalyanchakravarthy, P., Lakshmi, T., Rupavathi, R., Krishnadilip, S., & Lakshmankumar, P. (2014). Android Based Safety Triggering Application. International Journal of Computer Science and Information Technologies, 5(1).

Khanpour, H., Caragea, C., & Biyani, P. (2018). Identifying emotional support in online health communities. In Proceedings of the AAAI Conference on Artificial Intelligence, vol. 32.

Kakar et al., "ConText: Supporting the Pursuit and Management of Evidence in Text-based Reporting Systems," In Proceedings of the 17th International Joint Conference on Computer Vision, Imaging and Computer Graphics Theory and Applications (VISIGRAPP 2022), 2022, pp. 388-50 vol. 3.

Seering, J., Luria, M., Ye, C., Kaufman, G., & Hammer, J. (2020). It Takes a Village: Integrating an Adaptive Chatbot into an Online Gaming Community. In Proceedings of the 2020 CHI Conference on Human Factors in Computing Systems. 1-13.

(56) References Cited

OTHER PUBLICATIONS

Shamekhi, A., Liao, Q. V., Wang, D., Bellamy, R. K., & Erickson, T. (2018). Face Value? Exploring the effects of embodiment for a group facilitation agent. In Proceedings of the 2018 CHI conference on human factors in computing systems. 1-13.
Shi, W., Wang, X., Oh, Y. J., Zhang, J., Sahay, S., & Yu, Z. (2020). Effects of persuasive dialogues: testing bot identities and inquiry strategies. In Proceedings of the 2020 CHI Conference on Human Factors in Computing Systems. 1-13.
Shimazu, H. (2002). Expertclerk: a conversational case-based reasoning tool for assisting salesclerk agents in e-commerce web shops. Artificial Intelligence Review, 18(3), 223-244.
Shum, H.-Y., He, X.-d., & Li, D. (2018). From Eliza to Xiaolce: challenges and opportunities with social chatbots. Frontiers of Information Technology & Electronic Engineering, 19(1), 10-26.
Shuyo, N. (2010). Language Detection Library for Java. github.com/optimaize/language-detector.
Silver, E., & Miller, L. L. (2004). Sources of informal social control in Chicago neighborhoods. Criminology, 42(3), 551-584.
Sivčević, D., Košanin, I., Nedeljkovic' c, S., Nikoli' c, V., Kuk, K., & Nogo, S. (2020). Possibilities of used intelligence based agents in instant messaging on e-government services. In 2020 19th International Symposium INFOTEH-JAHORINA (INFOTEH) (pp. 1-5). IEEE.
Skjuve, M., Haugstveit, I. M., Følstad, A., & Brandtzaeg, P. B. (2019). HELP! Is my chatbot falling into the uncanny valley? An empirical study of user experience in human-chatbot interaction. Human Technology, 15(1).
Smyth, T. N., Etherton, J., & Best, M. L. (2010). MOSES: Exploring new ground in media and post-conflict reconciliation. In Proceedings of the SIGCHI conference on Human Factors in computing systems. 1059-1068.
Stenetorp, P., Pyysalo, S., Topic, G., Ohta, T., Ananiadou, S., & Tsujii, J.'. (2012). brat: a Web-based Tool for NLP-Assisted Text Annotation. In Proceedings of the Demonstrations Session at EACL 2012. Association for Computational Linguistics, Avignon, France.
Stephanidis, C., Salvendy, G., Antona, M., Chen, J. Y., Dong, J., Dufy, V. G., . . . & Fu, L. P. (2019). Seven HCI grand challenges. International Journal of Human-Computer Interaction, 35(14), 1229-1269.
Suler, J. (2011). The psychology of text relationships. In Online counseling. Elsevier, 21-53.
Sun, L., & Yin, Y. (2017). Discovering themes and trends in transportation research using topic modeling. Transportation Research Part C: Emerging Technologies, 77, 49-66.
Tanaka, H., Sakti, S., Neubig, G., Toda, T., Negoro, H., Iwasaka, H., & Nakamura, S. (2015). Automated social skills trainer. In Proceedings of the 20th International Conference on Intelligent User Interfaces. 17-27.
Tegos, S., Demetriadis, S., & Karakostas, A. (2015). Promoting academically productive talk with conversational agent interventions in collaborative learning settings. Computers & Education, 87, 309-325.
Ter Stal, S., Kramer, L. L., Tabak, M., op den Akker, H., & Hermens, H. (2020). Design features of embodied conversational agents in eHealth: a literature review. International Journal of Human-Computer Studies, 138, 102409.
Thomas, P., McDuf, D., Czerwinski, M., & Craswell, N. (2020). Expressions of style in information seeking conversation with an agent. In Proceedings of the 43rd International ACM SIGIR Conference on Research and Development in Information Retrieval. 1171-1180.
Tichy, W. F., Lukowicz, P., Prechelt, L., & Heinz, E. A. (1995). Experimental evaluation in computer science: A quantitative study. Journal of Systems and Software, 28(1), 9-18.
Toxtli, C., Monroy-Hernandez, A., & Cranshaw, J. (2018). Understanding chatbot-mediated task management. In Proceedings of the 2018 CHI conference on human factors in computing systems. 1-6.
Tracy, S. J., & Tracy, K. (1998). Emotion labor at 911: A case study and theoretical critique.

University of Illinois Chicago. (2022). UIC Safe App Office of Preparedness and Response University of Illinois Chicago. https://ready.uic.edu/toolkit/uic-safe-app/. Online; accessed Jul. 6, 2022.
Van Dijk, T. A. (1997). Discourse as structure and process. vol. 1. Sage.
Van Pinxteren, M. M., Pluymaekers, M., & Lemmink, J. G. (2020). Human-like communication in conversational agents: a literature review and research agenda. Journal of Service Management.
Vaux, A., Riedel, S., & Stewart, D. (1987). Modes of social support: The social support behaviors (SS-B) scale. American Journal of Community Psychology, 15(2), 209-232.
Vogel, D., & Balakrishnan, R. (2004). Interactive public ambient displays: transitioning from implicit to explicit, public to personal, interaction with multiple users. In Proceedings of the 17th annual ACM symposium on User interface software and technology. 137-146.
Volkel, S. T., Haeuslschmid, R., Werner, A., Hussmann, H., & Butz, A. (2020). How to Trick AI: Users' Strategies for Protecting Themselves from Automatic Personality Assessment. In Proceedings of the 2020 CHI conference on human factors in computing systems. 1-15.
Vtyurina, A., Savenkov, D., Agichtein, E., & Clarke, C. L. A. (2017). Exploring conversational search with humans, assistants, and wizards. In Proceedings of the 2017 chi conference extended abstracts on human factors in computing systems. 2187-2193.
Wainer, J., & Barsottini, C. B. (2007). Empirical research in CSCW-a review of the ACM/CSCW conferences from 1998 to 2004. Journal of the Brazilian Computer Society, 13(3), 27-35.
Wainer, J., Barsottini, C. G. N., Lacerda, D., & de Marco, L. R. M. (2009). Empirical evaluation in Computer Science research published by ACM. Information and Software Technology, 51(6), 1081-1085.
Walker, C., Strassel, S., Medero, J., & Maeda, K. (2006). ACE 2005 multilingual training corpus. Linguistic Data Consortium, Philadelphia 57, 45.
Wambsganss, T., Hoch, A., Zierau, N., & Sollner, M. Ethical Design of Conversational Agents: Towards Principles for a Value-Sensitive Design. ([n. d.]), Wirtschaftsinformatik 2021 Proceedings, 2021, 18 pages.
Wambsganss, T., Winkler, R., Söllner, M., & Leimeister, J. M. (2020). A conversational agent to improve response quality in course evaluations. In Extended Abstracts of the 2020 CHI Conference on Human Factors in Computing Systems. 1-9.
Wang, J., Yang, H., Shao, R., Abdullah, S., & Sundar, S. S. (2020). Alexa as coach: Leveraging smart speakers to build social agents that reduce public speaking anxiety. In Proceedings of the 2020 CHI Conference on Human Factors in Computing Systems. 1-13.
Wang, Q., Saha, K., Gregori, E., Joyner, D., & Goel, A. (2021). Towards Mutual Theory of Mind in Human-AI Interaction: How Language Reflects What Students Perceive About a Virtual Teaching Assistant. In Proceedings of the 2021 CHI Conference on Human Factors in Computing Systems. 1-14.
Wertheimer, M., & Puente, A. E. (2020). A brief history of psychology. Routledge.
Whalen, J., & Zimmerman, D. H. (1998). Observations on the Display and Management of Emotion in Naturally Occurring Activities: The Case of "Hysteria" in Calls to 9-1-1. Social Psychology Quarterly, 61(2), 141-159. http://www.jstor.org/stable/2787066.
Whittaker, M., Crawford, K., Dobbe, R., Fried, G., Kaziunas, E., Mathur, V., . . . Schwartz, O. (2018). AI now report 2018. AI Now Institute at New York University New York.
Wolfswinkel, J. F., Furtmueller, E., & Wilderom, C. P. M. (2013). Using grounded theory as a method for rigorously reviewing literature. European journal of information systems, 22(1), 45-55.
Wu, C.- S., Hoi, S., Socher, R., & Xiong, C. (2020). TOD-BERT: Pre-trained natural language understanding for task-oriented dialogue. arXiv preprint arXiv:2004.06871.
Wu, C.-S., Madotto, A., Hosseini-Asl, E., Xiong, C., Socher, R., & Fung, P. (2019). Transferable multi-domain state generator for task-oriented dialogue systems. arXiv preprint arXiv:1905.08743.
Xia, C., Zhang, C., Yang, T., Li, Y., Du, N., Wu, X., . . . & Yu, P. (2019). Multi-grained named entity recognition. arXiv preprint arXiv:1906.08449.

(56) References Cited

OTHER PUBLICATIONS

Xiao, Z., Zhou, M. X., & Fu, W.-T. (2019). Who should be my teammates: Using a conversational agent to understand individuals and help teaming. In Proceedings of the 24th International Conference on Intelligent User Interfaces. 437-447.

Xiao, Z., Zhou, M. X., Chen, W., Yang, H., & Chi, C. (2020). If I Hear You Correctly: Building and Evaluating Interview Chatbots with Active Listening Skills. In Proceedings of the 2020 CHI Conference on Human Factors in Computing Systems. 1-14.

Xiao, Z., Zhou, M. X., Liao, Q. V., Mark, G., Chi, C., Chen, W., & Yang, H. (2020). Tell me about yourself: Using an AI-powered chatbot to conduct conversational surveys with open-ended questions. ACM Transactions on Computer-Human Interaction (TOCHI), 27(3), 1-37.

Xie, M. (2014). Area differences and time trends in crime reporting: Comparing New York with other metropolitan areas. Justice Quarterly, 31(1), 43-73.

Xu, A., Liu, Z., Guo, Y., Sinha, V., & Akkiraju, R. (2017). A new chatbot for customer service on social media. In Proceedings of the 2017 CHI conference on human factors in computing systems. 3506-3510.

Yabe, M. (2017). Cost-benefit evaluation: Students', faculty's, and staff's willingness to pay for a campus safety app. Journal of Criminal Justice Education, 28(2), 207-221.

Yang, H., Aguirre, C. A., Maria, F., Christensen, D., Bobadilla, L., Davich, E., . . . & Lam, A. (2019). Pipelines for procedural information extraction from scientific literature: towards recipes using machine learning and data science. In 2019 International conference on document analysis and recognition workshops (ICDARW), vol. 2. IEEE, 41-46.

Yang, S., Feng, D., Qiao, L., Kan, Z., & Li, D. (2019). Exploring pre-trained language models for event extraction and generation. In Proceedings of the 57th Annual Meeting of the Association for Computational Linguistics (pp. 5284-5294).

Yu, Q., Nguyen, T., Prakkamakul, S., & Salehi, N. (2019). "I Almost Fell in Love with a Machine" Speaking with Computers Affects Self-disclosure. In Extended Abstracts of the 2019 CHI Conference on Human Factors in Computing Systems. 1-6.

Yuan, X., & Chee, Y. S. (2005). Design and evaluation of Elva: an embodied tour guide in an interactive virtual art gallery. Computer animation and virtual worlds, 16(2), 109-119.

Zhang, A. X., & Cranshaw, J. (2018). Making sense of group chat through collaborative tagging and summarization. Proceedings of the ACM on Human-Computer Interaction, 2(CSCW), 1-27.

Zheng, J., Yuan, X., & Chee, Y. S. (2005). Designing multiparty interaction support in Elva, an embodied tour guide. In Proceedings of the fourth international joint conference on Autonomous agents and multiagent systems. 929-936.

Zheng, Q., Markazi, D. M., Tang, Y., & Huang, Y. (2021). " PocketBot is Like a Knock-on-the-Door!": Designing a Chatbot to Support Long-Distance Relationships. Proceedings of the ACM on Human-Computer Interaction, 5 (CSCW2), 1-28.

Zheng, Q., Tang, Y., Liu, Y., Liu, W., & Huang, Y. (Apr. 2022). UX research on conversational human-AI interaction: A literature review of the ACM Digital Library. In CHI Conference on Human Factors in Computing Systems (CHI '22). ACM. http://dx.doi.org/10.1145/3491102.3501855.

Zhou, M. X., Mark, G., Li, J., & Yang, H. (2019). Trusting virtual agents: The effect of personality. ACM Transactions on Interactive Intelligent Systems (TiiS), 9(2-3), 1-36.

Ziegenhagen, E. A. (1977). Victims, crime, and social control. Praeger New York.

Lee, Y.-C., Yamashita, N., & Huang, Y. (2021). Exploring the Effects of Incorporating Human Experts to Deliver Journaling Guidance through a Chatbot. Proceedings of the ACM on Human-Computer Interaction, 5(CSCW1), 1-27.

Klopfenstein, L. C., Delpriori, S., Malatini, S., & Bogliolo, A. (2017). The rise of bots: A survey of conversational interfaces, patterns, and paradigms. In Proceedings of the 2017 conference on designing interactive systems (pp. 555-565).

Kocaballi, A. B., Berkovsky, S., Quiroz, J. C., Laranjo, L., Tong, H. L., Rezazadegan, D., . . . & Coiera, E. (2019). The personalization of conversational agents in health care: systematic review. Journal of medical Internet research, 21(11), e15360.

Kocielnik, R., Avrahami, D., Marlow, J., Lu, D., & Hsieh, G. (2018). Designing for workplace reflection: a chat and voice-based conversational agent. In Proceedings of the 2018 designing interactive systems conference (pp. 881-894).

Kolfschoten, G. L., & De Vreede, G.-J. (2007). The collaboration engineering approach for designing collaboration processes. In International Conference on Collaboration and Technology (pp. 95-110).

Kopp, S., Gesellensetter, L., Krämer, N. C., & Wachsmuth, I. (2005). A conversational agent as museum guide-design and evaluation of a real-world application. In International workshop on intelligent virtual agents (pp. 329-343).

Kozlowski, S. W. J., & Ilgen, D. R. (2006). Enhancing the effectiveness of work groups and teams. Psychological science in the public interest, 7(3), 77-124.

Kraak, J. M., & Holmqvist, J. (2017). The authentic service employee: Service employees' language use for authentic service experiences. Journal of Business Research, 72, 199-209.

Ku, C. H., Iriberri, A., & Leroy, G. (2008). Crime information extraction from police and witness narrative reports. In 2008 IEEE Conference on Technologies for Homeland Security (pp. 193-198).

Kumar, R., & Rose, C. P. (2014). Triggering effective social support for online groups. ACM Transactions on Interactive Intelligent Systems (TiiS), 3(4), 1-32.

Kumar, R., Ai, H., Beuth, J. L., & Rosé, C. P. (2010). Socially capable conversational tutors can be effective in collaborative learning situations. In International conference on intelligent tutoring systems (pp. 156-164).

Lamont, M., & Molnár, V. (2002). The study of boundaries in the social sciences. Annual review of sociology, 28(1), 167-195.

Laranjo, L., Dunn, A. G., Tong, H. L., Kocaballi, A. B., Chen, J., Bashir, R., . . . & Lau, A. Y. S. (2018). Conversational agents in healthcare: a systematic review. Journal of the American Medical Informatics Association, 25(9), 1248-1258.

Large, D. R., Clark, L., Burnett, G., Harrington, K., Luton, J., Thomas, P., & Bennett, P. (2019). "It's small talk, jim, but not as we know it." engendering trust through human-agent conversation in an autonomous, self-driving car. In Proceedings of the 1st International Conference on Conversational User Interfaces (pp. 1-7).

Lau, T., Cerruti, J., Manzato, G., Bengualid, M., Bigham, J. P., & Nichols, J. (2010). A conversational interface to web automation. In Proceedings of the 23nd annual ACM symposium on User interface software and technology (pp. 229-238).

Lee, C.-H., Cheng, H., & Ostendorf, M. (2021). Dialogue state tracking with a language model using schema-driven prompting. arXiv preprint arXiv:2109.07506.

Lee, M., Ackermans, S., van As, N., Chang, H., Lucas, E., & IJsselsteijn, W. (2019). Caring for Vincent: a chatbot for self-compassion. In Proceedings of the 2019 CHI Conference on Human Factors in Computing Systems (pp. 1-13).

Lee, Y.-C., Yamashita, N., & Huang, Y. (2020). Designing a chatbot as a mediator for promoting deep self-disclosure to a real mental health professional. Proceedings of the ACM on Human-Computer Interaction, 4(CSCW1), 1-27.

Lee, Y.-C., Yamashita, N., Huang, Y., & Fu, W. (2020). " I Hear You, I Feel You": Encouraging Deep Self-disclosure through a Chatbot. In Proceedings of the 2020 CHI conference on human factors in computing systems (pp. 1-12).

Lemp, J. D., Kockelman, K. M., & Damien, P. (2010). The continuous cross-nested logit model: Formulation and application for departure time choice. Transportation Research Part B: Methodological, 44(5), 646-661.

Lewis, S., & Lewis, D. A. (2012). Examining Technology That Supports Community Policing. In Proceedings of the SIGCHI Conference on Human Factors in Computing Systems (Austin, Texas, USA) (CHI '12) (pp. 1371-1380). Association for Computing Machinery.

(56) References Cited

OTHER PUBLICATIONS

Li, S., Ji, H., & Han, J. (2021). Document-level event argument extraction by conditional generation. arXiv preprint arXiv:2104.05919.
Liao, Q. V., Hussain, M. M.-u., Chandar, P., Davis, M., Khazaeni, Y., Crasso, M. P., . . . & Geyer, W. (2018). All work and no play?. In Proceedings of the 2018 CHI Conference on Human Factors in Computing Systems (pp. 1-13).
Lin, Y., Ji, H., Huang, F., & Wu, L. (2020). A joint neural model for information extraction with global features. In Proceedings of the 58th Annual Meeting of the Association for Computational Linguistics (pp. 7999-8009).
Lisetti, C., Amini, R., Yasavur, U., & Rishe, N. (2013). I can help you change! an empathic virtual agent delivers behavior change health interventions. ACM Transactions on Management Information Systems (TMIS), 4(4), 1-28.
Liu, M., Ding, Q., Zhang, Y., Zhao, G., Hu, C., Gong, J., . . . & Wang, Q. (2020). Cold Comfort Matters-How Channel-Wise Emotional Strategies Help in a Customer Service Chatbot. In Extended Abstracts of the 2020 CHI Conference on Human Factors in Computing Systems (pp. 1-7).
Liu, Y., Maier, W., Minker, W., & Ultes, S. (2021). Context Matters in Semantically Controlled Language Generation for Task-oriented Dialogue Systems. arXiv preprint arXiv:2111.14119.
Liu, Y., Mayfield, R., & Huang, Y. (2022). Discovering the Hidden Facts of User-Dispatcher Interactions via Text-based Reporting Systems for Community Safety. arXiv preprint arXiv:2211.04618.
Lovato, S. B., Piper, A. M., & Wartella, E. A. (2019). Hey Google, do unicorns exist? Conversational agents as a path to answers to children's questions. In Proceedings of the 18th ACM International Conference on Interaction Design and Children (pp. 301-313).
Loveys, K., Sebaratnam, G., Sagar, M., & Broadbent, E. (2020). The effect of design features on relationship quality with embodied conversational agents: a systematic review. International Journal of Social Robotics, 12(6), 1293-1312.
Low, C., & Moshuber, L. (2020). Gratzelbot-Gamifying Onboarding to Support Community-Building among University Freshmen. In Proceedings of the 11th Nordic Conference on Human-Computer Interaction: Shaping Experiences, Shaping Society (pp. 1-3).
Lundkvist, A., & Yakhlef, A. (2004). Customer involvement in new service development: a conversational approach. Managing Service Quality: An International Journal.
Luria, M., Seering, J., Forlizzi, J., & Zimmerman, J. (2020). Designing Chatbots as Community-Owned Agents. In Proceedings of the 2nd Conference on Conversational User Interfaces (pp. 1-3).
Luria, M., Zheng, R., Hufman, B., Huang, S., Zimmerman, J., & Forlizzi, J. (2020). Social Boundaries for Personal Agents in the Interpersonal Space of the Home. In Proceedings of the 2020 CHI Conference on Human Factors in Computing Systems (pp. 1-12).
Lyu, Q., Zhang, H., Sulem, E., & Roth, D. (2021). Zero-shot event extraction via transfer learning: Challenges and insights. In Proceedings of the 59th Annual Meeting of the Association for Computational Linguistics and the 11th International Joint Conference on Natural Language Processing (vol. 2: Short Papers) (pp. 322-332).
Ma, Y., Nguyen, K. L., Xing, F. Z., & Cambria, E. (2020). A survey on empathetic dialogue systems. Information Fusion, 64, 50-70.
Marti, S., & Schmandt, C. (2005). Physical embodiments for mobile communication agents. In Proceedings of the 18th annual ACM symposium on User interface software and technology (pp. 231-240).
Matias, J. N., Johnson, A., Boesel, W. E., Keegan, B., Friedman, J., & DeTar, C. (2015). Reporting, reviewing, and responding to harassment on Twitter. arXiv preprint arXiv:1505.03359.
McDonald, N., Schoenebeck, S., & Forte, A. (2019). Reliability and inter-rater reliability in qualitative research: Norms and guidelines for CSCW and HCI practice. Proceedings of the ACM on Human-Computer Interaction, 3(CSCW), 1-23.
McTear, M. (2020). Conversational AI: Dialogue Systems, Conversational Agents, and Chatbots. Synthesis Lectures on Human Language Technologies, 13(3), 1-251.
McTear, M. F., Callejas, Z., & Griol, D. (2016). The conversational interface. vol. 6. Springer.
Medhi, I., Patnaik, S., Brunskill, E., Gautama, S. N., Thies, W., & Toyama, K. (2011). Designing mobile interfaces for novice and low-literacy users. ACM Transactions on Computer-Human Interaction (TOCHI), 18(1), 1-28.
Mencarini, E., Rapp, A., Tirabeni, L., & Zancanaro, M. (2019). Designing wearable systems for sports: A review of trends and opportunities in human-computer interaction. IEEE Transactions on Human-Machine Systems, 49(4), 314-325.
Microsoft. (2018). Responsible bots: 10 guidelines for developers of conversational AI.
Ming, S., Mayfield, R. D. W., Cheng, H., Wang, K.-R., & Huang, Y. (2021). Examining interactions between community members and university safety organizations through community-sourced risk systems. Proceedings of the ACM on Human-Computer Interaction, 5(CSCW1), Article 37. https://doi.org/10.1145/3449111.
Minhas, R., Elphick, C., & Shaw, J. (2022). Protecting victim and witness statement: examining the effectiveness of a chatbot that uses artificial intelligence and a cognitive interview. AI & Society, 37(1), 265-281.
Mirbabaie, M., Stieglitz, S., Brunker, F., Hofeditz, L., Ross, B., & Frick, N. R. J. (2021). Understanding collaboration with virtual assistants—the role of social identity and the extended self. Business & Information Systems Engineering, 63(1), 21-37.
Mitchell, E. G., Maimone, R., Cassells, A., Tobin, J. N., Davidson, P., Smaldone, A. M., & Mamykina, L. (2021). Automated vs. Human Health Coaching: Exploring Participant and Practitioner Experiences. Proceedings of the ACM on Human-Computer Interaction, 5(CSCW1), 1-37.
Modi, P. J., Veloso, M., Smith, S. F., & Oh, J. (2004). Cmradar: A personal assistant agent for calendar management. In International Bi-Conference Workshop on Agent-Oriented Information Systems (pp. 169-181).
Montenegro, J. L. Z., da Costa, C. A., & Righi, R. d. R. (2019). Survey of conversational agents in health. Expert Systems with Applications, 129, 56-67.
Mou, Y., & Xu, K. (2017). The media inequality: Comparing the initial human-human and human-AI social interactions. Computers in Human Behavior, 72, 432-440.

\* cited by examiner

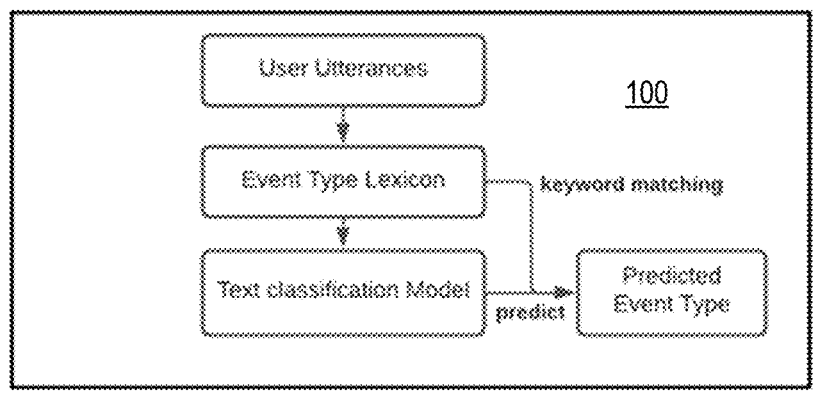
FIG. 1
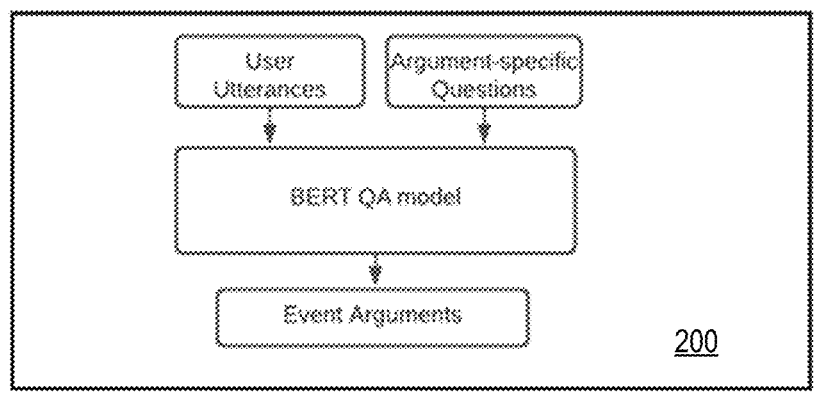
FIG. 2
FIG. 3

EFFICIENT CONTENT EXTRACTION FROM UNSTRUCTURED DIALOG TEXT

CROSS-REFERENCE TO RELATED APPLICATION

The present application claims priority from U.S. provisional patent application No. 63/457,292, filed on Apr. 5, 2023, the contents of which are incorporated by reference.

BACKGROUND

Available resources to receive safety-related reports (e.g., about crimes, about fires, about natural disasters, about health events) are limited. It can be beneficial to apply automated chat systems to relieve such resources by engaging in dialogs with community members and extracting incident report-relevant information therefrom, so that community members in need of assistance and/or involved in emergent situations can be serviced by human dispatchers, police, or other emergency services personnel. However, it is difficult to design or train automated systems to engage in such dialogs in a considerate manner while also obtaining all relevant information across a variety of different potential incident types. Such automated systems may also be tightly constrained with respect to available memory, processor capability, or other computational resources available to an emergency department.

SUMMARY

In a first aspect, a method is provided that includes: (i) receiving initial text from a user; (ii) applying the initial text to a classifier to select, from an enumerated set of incident types, a session incident type, wherein the session incident type is associated with a set of session incident properties; (iii) applying the initial text and an indication of the set of session incident properties to a machine learning model to generate a value for a session incident property of the set of session incident properties; (iv) based on the session incident property, selecting, from a list of queries, a query about a further session incident property whose value has not yet been generated by the machine learning model in relation to the initial text; (v) providing the query to the user; (vi) receiving additional text from the user in response to the query; and (vii) applying the additional text and the indication of the set of session incident properties to the machine learning model to generate an additional value for an additional session incident property of the set of session incident properties.

In a second aspect, a method is provided that includes: (i) receiving initial text from a user; (ii) applying the initial text to a classifier to select, from an enumerated set of incident types, a session incident type, wherein the session incident type is associated with a set of session incident properties; (iii) applying the initial text and an indication of the set of session incident properties to a machine learning model to generate an output that indicates (a) a value for a session incident property of the set of session incident properties and (b) a query about a further session incident property of the set of session incident properties whose value has not yet been generated by the machine learning model in relation to the initial text; (iv) based on the output, updating a list indicating which of the set of session incident properties have values that have been generated by the machine learning model in relation to the initial text; (v) providing the query to the user; (vi) receiving additional text from the user in response to the query; and (vii) applying the additional text, the indication of the set of session incident properties, and an indication of the list to the machine learning model to generate an additional output that indicates an additional value for an additional session incident property of the set of session incident properties.

In a third aspect, a non-transitory computer readable medium is provided having stored thereon program instructions executable by at least one processor to cause the at least one processor to perform the method of the first or second aspects.

In a fourth aspect, system is provided that includes: (i) a controller comprising one or more processors, and (ii) a non-transitory computer readable medium having stored thereon program instructions executable by the controller to cause the controller to perform the method of the first or second aspects.

BRIEF DESCRIPTION OF THE DRAWINGS

The accompanying drawings are included to provide a further understanding of the system and methods of the disclosure and are incorporated in and constitute a part of this specification. The drawings illustrate one or more embodiment(s) of the disclosure, and together with the description serve to explain the principles and operation of the disclosure.

FIG. 1 depicts aspects of an incident type classification model, in accordance with example embodiments.

FIG. 2 depicts aspects of an incident argument extraction model, in accordance with example embodiments.

FIG. 3 shows an example snippet from an annotated dialogue.

DETAILED DESCRIPTION

Figure 4:
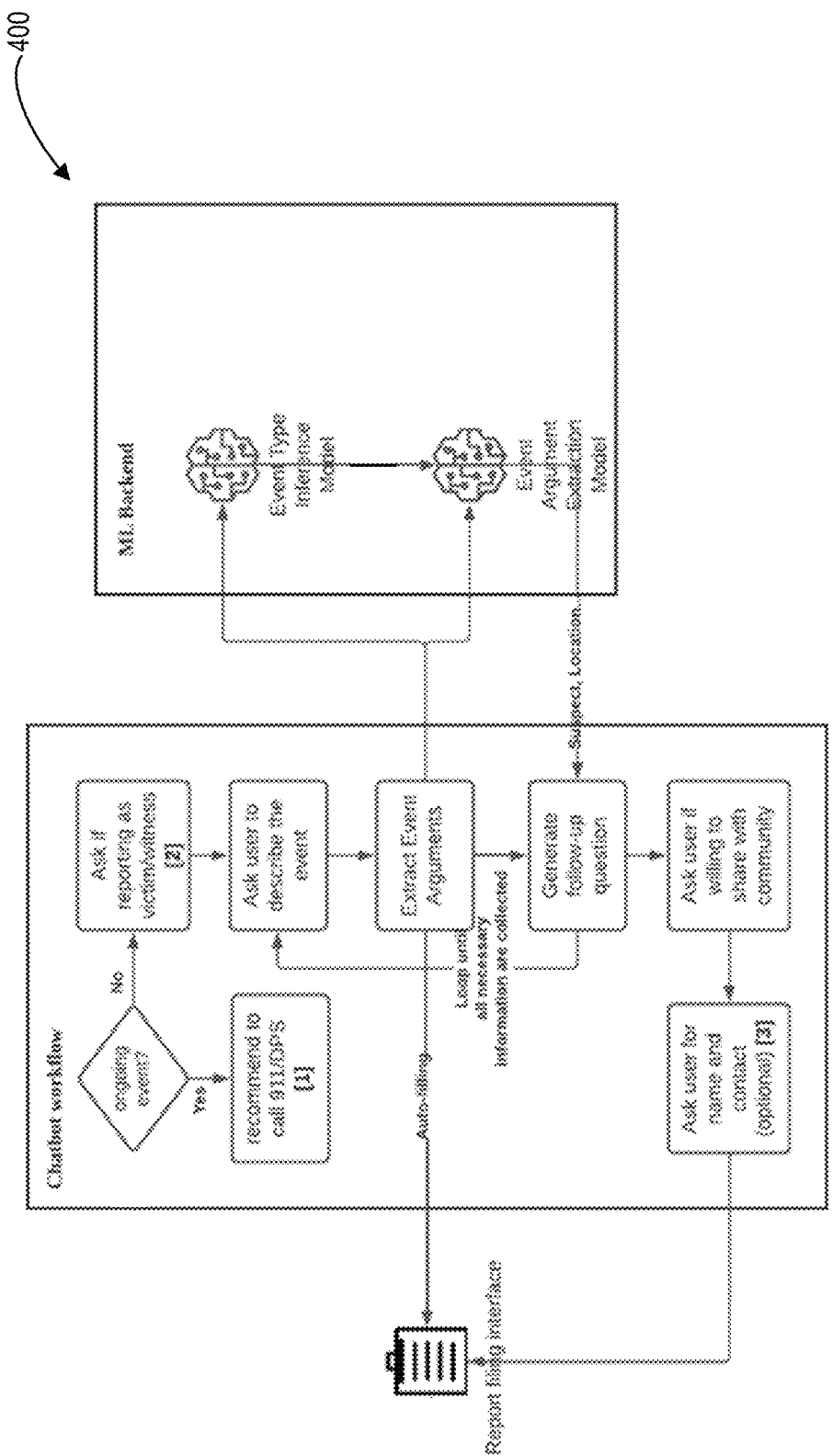
FIG. 4 depicts aspects of an example method.

The following detailed description describes various features and functions of the disclosed embodiments with reference to the accompanying figures. The illustrative embodiments described herein are not meant to be limiting. It may be readily understood that certain aspects of the disclosed embodiments can be arranged and combined in a wide variety of different configurations, all of which are contemplated herein.

To that end, example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein. Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Unless clearly indicated otherwise herein, the term "or" is to be interpreted as the inclusive disjunction. For example, the phrase "A, B, or C" is true if any one or more of the arguments A, B, C are true, and is only false if all of A, B, and C are false

I. OVERVIEW

It is desirable in many scenarios to use automated agents to engage with users for routine tasks, thereby allowing human agents to engage with higher-priority users, e.g., users who are in need of immediate emergency assistance from emergency medical services, the fire department, the police, or other emergency services. For example, users who are contacting a health and safety department (e.g., the website of a police department) in order to report information about an incident that has already occurred could interact with an automated agent in order to provide information necessary to generate, in an automated or semi-automated fashion, a report that can then be used to investigate past incidents and/or predict or prepare for future incidents. Additionally, providing such systems, which can reduce the effort needed to provide a report (relative to, e.g., calling or going in person to a public safety office), can reduce under-reporting, particularly in the context of reporting crimes using emergency phone lines (911).

However, to achieve a specified level of accuracy and thoroughness with respect to the incident report such automated agents can obtain from human users, such automated agents can be computationally expensive to operate (e.g., with respect to the memory, computational cycles, or other computational resources needed to implement and execute such agents). When such agents include machine learning models or other elements trained using actual examples of user chat sessions or other user-based text, such agents can require significant amounts of such training data. These computational costs are amplified in the context of engaging with users providing reports on incidents as described herein, as such automated agents may also be required to exhibit emotional support to the users and to avoid interacting in a manner that is inconsiderate of the emotional state of users who may have recently experienced or witnessed criminal activity, injuries, or other emotionally significant incidents while also obtaining from such users an extensive set of information about such incidents.

Embodiments described herein provide automated agents that exhibit increased accuracy and thoroughness with respect to the ability to obtain, from users, relevant descriptive information about a variety of different types of incident (e.g., medical emergencies, crimes, natural disasters, events requiring community emergency services or investigation) while also exhibiting reduced computational cost (e.g., memory, processor cycles, amount of training data) relative to alternative systems and methods. These benefits are obtained by using the user's text inputs from an ongoing information reporting session (e.g., one or more chat messages sent by the user to a central server or other system via a website, chat application, or other communications channel) to first select, from an enumerated list of possible incident types, the type of incident the user is describing in the session.

This allows the identity of the selected incident type to be provided to downstream predictors (e.g., transformers, large language models (LLMs), or other machine learning models) thereby allowing them to condition on this information when extracting values for properties of the selected incident type. This can take the form of providing, to the downstream model(s), an incident type-specific list of properties whose values should be extracted from the user's already-provided text and/or whose values should be asked about by the agent. By allowing the downstream models to condition on the identified type of the incident, these downstream models can be smaller (and thus less computationally expensive to implement and execute) and can be trained and/or fine-tuned using a smaller amount of training data (relative to, e.g., models that must also 'learn' to identify the incident type and set of relevant properties therefor from the user text).

A variety of different classifiers can be used to select, from an enumerated list of possible incident types, an incident type for a current session based on user text received in the current session. For example, keyword matching methods, word, sentence, and/or paragraph vector embeddings, perceptrons or other types of neural networks operating on embeddings of the words in the user text, and/or other types of manually-programmed and/or trained methods could be applied. FIG. 1 depicts a particular example of aspects of such a classifier 100.

The classifier 100 first applies user text(s) ("User Utterances") to a lexicon of keywords and/or key phrases ("Event Type Lexicon"), performing keyword matching between words and/or phrases of the user text and sets of keywords and/or hey phrases that correspond to the enumerated incident types. If a match is identified, the match is used to select one of the incident types ("Predicted Event Type") from the enumerated list of possible incident types. If the keyword and/or key phrase matching does not identify a match (e.g., due to no matches being identified, or due to multiple incident types exhibiting sufficient matches to make it difficult or impossible to identify a single incident type from the set of types with matches), then the user text can be applied to a trained model ("Text classification Model") to identify an incident type therefor. Such a trained model can be trained using, e.g., manually annotated sets of text or chat logs, and can include an artificial neural network, a logistic regression, and/or some other type of model architecture. By applying keyword matching first (which can exhibit significantly less computational cost than executing more complex models), and then applying a more complex model only when the keyword matching fails to identify an incident type, the expected computational cost of identifying an incident type for the user text can be reduced.

The enumerated list of possible incident types, and their associated sets of properties to be extracted from and/or evoked in user text, can be adapted to the particular application and intended location or population of use. For example, the enumerated list of possible incident types could include suspicious activity, drugs or alcohol, harassment or abuse, theft or lost item, mental health, and/or a generic "emergency message" about an incident that does not fall under any of the other incident types.

A variety of properties could be extracted from user text for some or all of the incident types. The properties could be related to the incident overall ("Event Arguments") and/or to specific entities related to the incident. For example, "Event Arguments" for some or all of the incident types could include the identity of an attacker (or other instigating agent of the incident), the identity of a target of the incident (intentional or unintentional), the identity of a weapon used in the incident, a start time of the incident, an end time of the incident, a location of the incident, and/or a target object of the incident (in examples wherein two different properties are assigned, depending on whether the 'target' of the incident is an object or a person). Entities associated with an incident may be recorded as properties of the incident and/or may be used to organize properties of the incident such that, e.g., multiple "age" properties can be obtained for multiple different people involved in the incident, as targets, attackers, witnesses, or other entities associated with the incident. Entities could include persons, locations, weapons, times, and objects. Entities could be associated with sub-entities, e.g., descriptive properties like an age, race, appearance, clothing, sex, action taken, name, or movement engaged in by a person (e.g., by an attacker, target, or witness), a description of a location, and/or a phone number and/or email of a contact (e.g., of the user providing information).

In addition to predicting the type of incident being reported by a user, the embodiments herein include transmitting, to the user, queries or other text to cause the user to provide additional text such that all of the information relevant to a given type of incident is provided. This user-submitted text can then be applied to a machine learning model in order to extract values for all (or at least some) of the properties relevant to the identified incident type. By predicting the incident type separately from these processes, they can be performed using less computer resources and/or training data, since these processes can be performed in a manner than is conditioned on or otherwise performed in a manner dependent upon the identified session type.

In some examples, a trained machine learning model (e.g., based on transformers) can be used to predict, based on the set of text received from the user (and optionally the set of text previously presented to the user, e.g., query to evoke additional answers) values for one or more of the set of properties relevant to the identified incident type. A list of the set of properties that have been 'answered' by the user can then be updated to include the newly-predicted one or more of the set of properties. This list can then be used to select, from a dialog tree or other structured list of queries, a query about at least one of the set of session incident properties whose value has not yet been generated by the machine learning model. This process can then be repeated until values have been predicted for all, or more than a threshold number, of the set of properties relevant to the identified incident type.

FIG. 4 illustrates aspects of an example of such a process 400. A user responds to a query ("Ask user to describe the event") with text, and that text is applied to a classifier ("Event Type Inference Model," e.g., the classifier 100 of FIG. 1) to identify, from an enumerated list of possible incident types, the type of incident that the user is reporting in the current chat session. This may be referred to as the "session incident type." The user text, along with an indication of the session incident type, are provided to a machine learning model ("Event Argument Extraction Model") in order to determine therefrom values for one or more of the pre-specified set of properties that are relevant to the session incident type. The set of properties whose values have been extracted in this manner is then used to generate a query ("Generate follow-up question," e.g., using a dialog tree or other list of queries). This can result in the follow-up query about other(s) of the set of properties being indicated to the user to prompt an answer. Alternatively, if it is determined that values for all, or more than a threshold number of, the session incident type-relevant properties have been extracted, the chat session could be terminated. Such termination could optionally include asking for additional information, e.g., contact information for the user and/or consent to share some or all of the reported information with the community publicly, with specified governmental or non-governmental agencies, or with some other group or individual(s).

Indeed, FIG. 4 depicts a number of optional additional steps or processes that may or may not be used in combination with the incident type identification and property value extraction methods described herein. For example, FIG. 4 depicts some optional initial steps for a chat session. These optional initial steps include verifying that the user is not presently experiencing an ongoing emergency incident ("ongoing event?"), and if they are, directing them to contact emergency services, and asking the user whether they are reporting an incident that they themselves were a part of as a victim or witness ("Ask if reporting as victim/witness") or if they are, instead, reporting on behalf of someone else. A chat session as described herein can also include providing an initial default query to the user to prompt them to begin providing information about the incident (at "Ask user to describe the event") which, in subsequent exchanges of the chat session, would be substituted by queries selected by a dialog tree or via some other method (e.g., using an LLM or other generative model to generate follow-up queries).

A model configured to extract values for incident type-relevant properties from user text as described herein (e.g., an "Event Argument Extraction Model), and the set of arguments applied thereto to generate such outputs, could take a variety of forms. For example, FIG. 2 depicts aspects of such a machine learning model 200 that receives as inputs user text ("User Utterances") and an indication of the identified session incident type (in the form of a set of "Argument-specific queries" for each of the properties in the set of session incident type-relevant properties). These are applied to a trained transformer-based model (e.g., a "BERT QA model" that has been trained to operate as a query-answering model) to generate an output ("Event Arguments") that represents values for one or more of the incident-type specific properties represented in the model input.

As noted above, indicating the identified session incident type can include providing, as part of a textual input to the model 200, queries corresponding to each of the properties that are relevant to the identified incident type. Additionally or alternatively, names or descriptions of the set of properties could be provided. In some examples, an indication of the set of the properties for which values have already been determined by the model 200 could also be provided; alternatively, the queries for properties whose values have already been determined could be omitted from the list of queries applied as input to the model 200. The user text applied as input to the model 200 could include all of the user text received from the user in the current chat session, or could be limited to the most recent user response or other user input.

Such a value-extracting model could be trained in a variety of ways based on a variety of chat logs or other training data. In some examples, the model (e.g., 200) could be trained on chat logs that have been annotated to indicate the property values (or "arguments") to be extracted therefrom and/or with the incident type of the chat sessions therein. Such annotations can also include annotations indicating the intent of the user and/or other entities (e.g., a dispatcher) in the set of chat logs; such annotations could be used to train a model to estimate user sentiment or emotional state, to generate follow-up queries, or to perform some other task(s). FIG. 3 indicates some examples of chat log text that has been annotated in order to facilitate supervised model training. As shown in FIG. 3, both user text ("User") and dispatcher text ("Admin") in the chat logs can be annotated with intents ("Intent_AskForDetail_PLACE"), text indicative of incident type ("Harass"), and text indicative of values for the properties relevant to the incident type of the chat text ("Person_Indefinite," "Attacker-Arg," "Description").

Additionally or alternatively, a trained machine learning model (e.g., an LLM) can be used to predict, based on the set of text received from the user (and optionally the set of text previously presented to the user, e.g., to guide additional answers), (i) values for one or more of the set of properties relevant to the identified incident type and (ii) a query about one or more of the set of properties relevant to the identified incident type whose values have not yet been predicted by the machine learning model. The output query can then be indicated to a user in order evoke further text indicative of further properties relevant to the identified incident type.

Executing such a model could include applying as input to the model both the already-received user text and an indication of identified session incident type. Such an indication can include indicating a list of the set of properties relevant to the identified incident type (e.g., as a set of queries, one for each of the relevant properties). A model used in this way can achieve a desired level of accuracy while being smaller (or otherwise less computationally expensive to implement or execute) and/or can be trained using less training data, since the model will not also need to 'learn' how to predict the type of the incident or the set of properties that are relevant to each of the enumerated types of incidents. Input to such a model can also include the set of queries or other text provided to the user to evoke their textual responses, an indication of the values of properties whose values have already been determine by the model, or other inputs.

The set of session incident type-relevant properties for which values have been determined could be tracked and used to, e.g., determine whether to terminate the session. For example, if it is determined that values for all, or for more than a threshold number of, the session incident type-relevant properties have been generated by the model, the chat session could be terminated. This allows the model, for a given level of accuracy, to be less computationally expensive to execute and/or to require less training data to train, since the model does not also need to predict whether to terminate the chat.

Such a query-generating model could be created in a variety of ways. For example, a pre-trained model (e.g., a generic query-answering model that has been trained on a large corpus of query-answer pairs) could be obtained and fine-tuned to predict a 'next query' that evokes information about non-answered input queries in addition to predicting the answers to those input queries whose values can be predicted based on the available user responses. Each chat log could provide a number of different training examples, as the model could be trained to predict each dispatcher response in a chat log based on the respective set of preceding user and dispatcher responses.

Models to predict incident type, to extract values for incident type-relevant properties, and to predict follow-up queries to evoke information about non-extracted incident properties as described herein can be trained using available chat log training data. A dataset of real-world user-dispatcher dialogues from the domain of safety incident reporting can be used for this training data. The dialogues can be collected using the LiveSafe app (other another application), which allows users to report certain incidents to a human agent via a chat service. LiveSafe is a community-based risk management system that focuses on increasing involvement and communication between members of an organization and the safety teams responsible for mitigating broad-spectrum risk. Community members submit information ("tips") through the LiveSafe mobile app or web portal, while safety organization managers respond to tips through the LiveSafe Command Dashboard. After the user's submission, the dispatchers from safety departments can reply to each tip and start a conversation with the user through the Command Dashboard provided by LiveSafe.

The initial dataset may contain a large amount of "noise," for example niche or organizational-specific tip categories. The data can be cleaned by removing "Test" tips and automatically created "Calls" entries (where users call the admins via the app) and also by removing tips that were submitted within the first year of implementation for each organization to ensure the organization had formed a consistent report handling workflow. The dataset can be also filtered by removing chats with fewer than three utterances (a single conversation turn), limiting the training dataset to chats with at least one turn of information-collecting conversation.

After performing this data cleaning, the resulting dialogues can be categorized into different incident categories, which individuals selected before initiating a chat conversation. Sensitive information (names, places, times, etc) in the dataset was masked for privacy. Note that this this masking may have an effect on model performance, since it is not always clear what the masked value was (e.g. "The incident must have occurred sometime between [TIME] and [TIME] which is when I got out of work.").

To capture the incident information from the conversations between users and dispatchers, an "incident ontology" (or, alternatively, "event ontology") was created to organize community incident extraction into different incident types and sub-types and related properties thereof. The final ontology may include three parts: incident type, incident argument, and (optionally) dispatcher intent. Since the initial incident category information provided by the LiveSafe dataset is coarse-grained and incident tips within the same category could turn out to be completely different incidents (e.g. domestic abuse and random harassment under HarrassmentAbuse), more fine-grained incident type information was annotated to distinguish such incidents. The incident types from this finer-grained ontology include Attack, Harassment, Abuse, Threat, Robbery, Theft, and Break-in. Incident types Attack, Harassment, Abuse, and Threat belong specifically to category HarassmentAbuse, and Robbery, Theft, and Break-in to TheftLostItem. During annotation of each incident, a word or phrase can be selected as the incident type and annotated as such. For the annotation of incident arguments, the Automatic Content Extraction (ACE) dataset schema can be modified to increase resolution and applied to analyze LiveSafe chat logs.

The incident arguments that are annotated include Attacker, Target, Location, Weapon, Start Time, End Time, and Target Object. Each incident argument can be connected to the incident handle, as a part of the incident information. Dispatchers' intent when asking users queries to collect additional event-related information can also be annotated. This includes noting which event argument dispatchers were asking for more information about. For example, as in FIG. 3, the dispatcher asked "where that subject is on campus", which was annotated as asking for detail about Location information.

After the final ontology was defined, two researchers annotated a total of 69 event chat logs with the ontology. The result annotations were considered consistent given an inter-annotator agreement (Cohen's Kappa) of 0.87. An example of annotated dialogue is shown in FIG. 3. The resulting annotated dataset contained a total of 69 conversations and 972 utterances.

Users reporting an incident might be subject to different causes that could lead to emotional instability or duress. Users who are experiencing or have experienced difficult or traumatizing safety incidents will often exhibit "emotional pain." In practice, human dispatchers may react to the emotional display of users to increase the users' trust in dispatchers and willingness to cooperate. This can include using directives, reassurances, realignment, repetitive persistence, and redirection of attention.

A model as described herein that predicts follow-up queries to evoke information about non-extracted incident properties could also be trained to provide responses that exhibit more compassion, especially for users exhibiting heightened emotional states. This can be done in order to provide additional comfort to such users, to respect their experiences, and to make it easier and less emotionally taxing for them to provide information about incidents that they are reporting. In some examples, such models could be trained to receive an additional input that is indicative of an emotional state of the user and to condition generated query outputs on that state input. This can be done in order to allow the model to have a reduced computational cost, since the model would not need to also be able to predict the emotional state internally.

The emotional state input could be generated, based on prior user text, using a sentiment prediction model (such as an LLM) or some other method for predicting a user's emotional state based on textual inputs therefrom. The predicted emotional state could take the form of a numerical value (e.g., a number 1-10 indicating a degree of emotional stress or duress experienced by the user) and/or a categorical description of the user's emotional state (e.g., anger, fear, joy, sadness, surprise and love). Training datasets including such emotional state information could be generated by applying a sentiment prediction model or some other method for predicting a user's emotional state to existing chat logs in order to provide annotations of the chat logs that represent the user's predicted emotional state over time, based on the text inputs provided by the user over time within each chat session of the chat logs.

Such training datasets can also be augmented in order to increase the amount of emotional support represented in the training datasets. This can result in models trained thereon exhibiting greater emotional care for users. This augmentation can include applying available chat logs to an LLM or other generative machine learning language model with a prompt to "increase the emotional support" of the input.

Where an LLM or other large, computationally expensive model is used to perform the methods described herein (e.g., to extract values for session incident type-relevant properties, to generate follow-up queries), such models can be executed remotely from a server or other computational system that performs the remainder of the method. For example, a server or other computational system located in a fire station or other community support office could operate to facilitate users' beginning chat sessions with the system, directing such users to 911 in the event that they are reporting emergent incidents, executing a classifier on users' text to identify incident types therefor, determining sets of relevant properties for identified incident types, and updating lists of values for such sets of properties as those values are extracted from user text. However, execution of an argument-extraction and/or query-generation model or other model as described herein could include the server or other computational system transmitting relevant information (e.g., user text, a list of session incident type-relevant properties, queries asking about each of the list of session incident type-relevant properties) to a remote computational system (e.g., a cloud computing system) that then executes the model based on the transmitted information. The remote computational system could then transmit the output of the model to the server or other computational system, which can then perform other aspects of the methods described herein based on that output. Such a setup can allow organizations or systems with relatively constrained computational resources (e.g., a single serve with limited memory, storage, or processor bandwidth) to accomplish the methods described herein by relying for only model execution on a remote system or service, which may be adapted to perform large model execution and/or which can provide such model execution services to many clients, increasing operational efficiency and utilization of such a service.

As described herein, an LLM is an advanced computational model, primarily functioning within the domain of natural language processing (NLP) and machine learning. An LLM can be configured to understand, interpret, generate, and respond to human language in a manner that is both contextually relevant and syntactically coherent. The underlying structure of an LLM is typically based on a neural network architecture, more specifically, a variant of the transformer model. Transformers are notable for their ability to process sequential data, such as text, with high efficiency.

The operation of an LLM involves layers of interconnected processing units, known as neurons, which collectively form a deep neural network. This network can be trained on vast datasets comprising text from diverse sources, thereby enabling the LLM to learn a wide array of language patterns, structures, and colloquial nuances for prose, poetry, and program code. The training process involves adjusting the weights of the connections between neurons using algorithms such as backpropagation, in conjunction with optimization techniques like stochastic gradient descent, to minimize the difference between the LLM's output and expected output.

An aspect of an LLM's functionality is its use of attention mechanisms, particularly self-attention, within the transformer architecture. These mechanisms allow the model to weigh the importance of different parts of the input text differently, enabling it to focus on relevant aspects of the data when generating responses or analyzing language. The self-attention mechanism facilitates the model's ability to generate contextually relevant and coherent text by understanding the relationships and dependencies between words or tokens in a sentence (or longer parts of texts), regardless of their position.

Upon receiving an input, such as a text query or a prompt, the LLM may process this input through its multiple layers, generating a probabilistic model of the language therein. It predicts the likelihood of each word or token that might follow the given input, based on the patterns it has learned during its training. The model then generates an output, which could be a continuation of the input text, an answer to a query, or other relevant textual content, by selecting words or tokens that have the highest probability of being contextually appropriate.

Furthermore, an LLM can be fine-tuned after its initial training for specific applications or tasks. This fine-tuning process involves additional training (e.g., with reinforcement from humans), usually on a smaller, task-specific dataset, which allows the model to adapt its responses to suit particular use cases more accurately. This adaptability makes LLMs highly versatile and applicable in various domains, including but not limited to, chatbot development, content creation, language translation, and sentiment analysis.

Some LLMs are multimodal in that they can receive prompts in formats other than text and can produce outputs in formats other than text. Thus, while LLMs are predominantly designed for understanding and generating textual data, multimodal LLMs extend this functionality to include multiple data modalities, such as visual and auditory inputs, in addition to text.

A multimodal LLM can employ an advanced neural network architecture, often a variant of the transformer model that is specifically adapted to process and fuse data from different sources. This architecture integrates specialized mechanisms, such as convolutional neural networks for visual data and recurrent neural networks for audio processing, allowing the model to effectively process each modality before synthesizing a unified output.

The training of a multimodal LLM involves multimodal datasets, enabling the model to learn not only language patterns but also the correlations and interactions between different types of data. This cross-modal training results in multimodal LLMs being adept at tasks that require an understanding of complex relationships across multiple data forms, a capability that text-only LLMs do not possess. This makes multimodal LLMs particularly suited for advanced applications that necessitate a holistic understanding of multimodal information, such as chatbots that can interpret and produce images and/or audio.

II. EXAMPLE SYSTEMS

Figure 5:
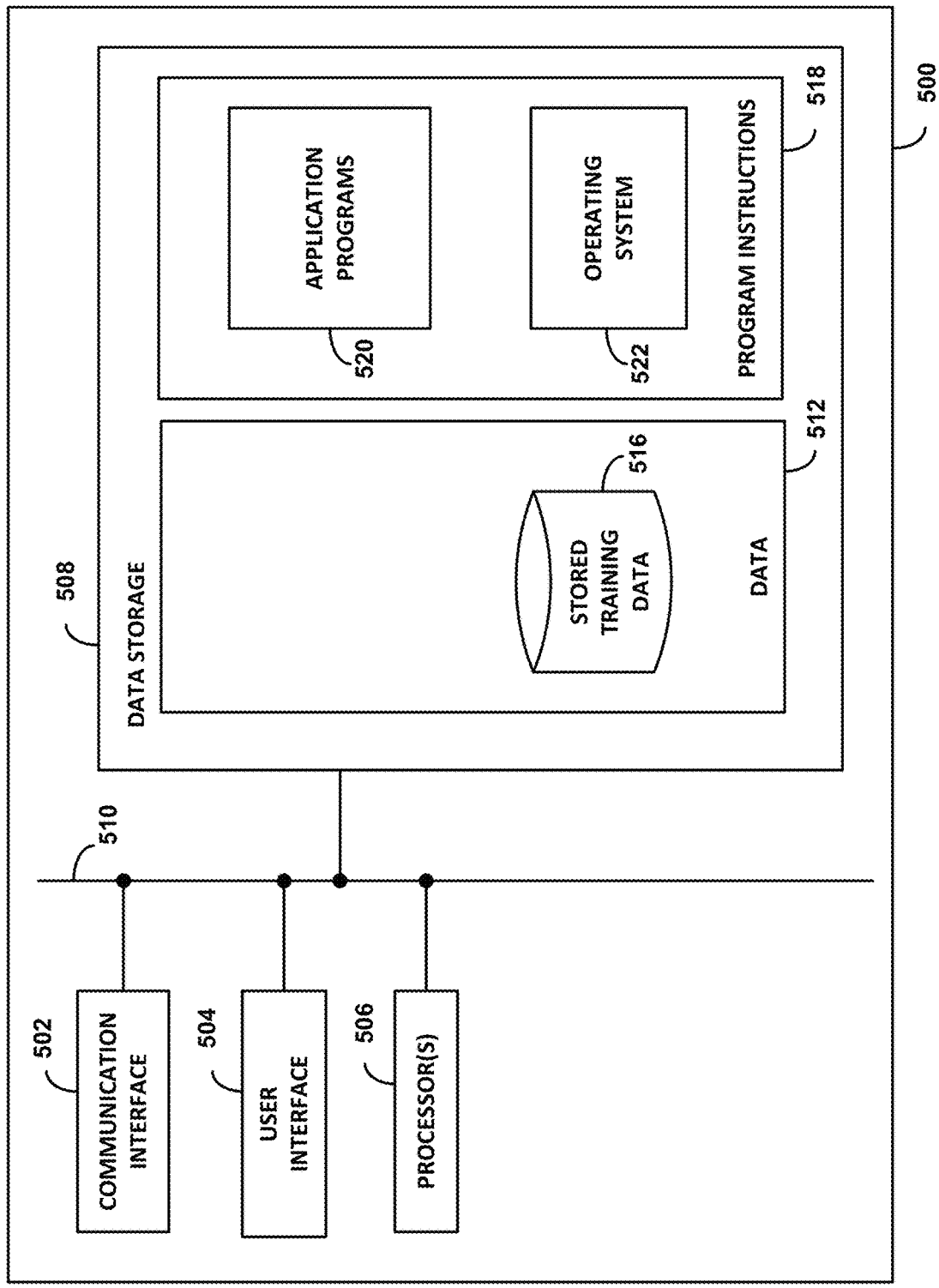
FIG. 5 depicts aspects of an example system.

FIG. 5 illustrates an example system 500 that may be used to implement the methods and/or apparatus described herein. By way of example and without limitation, system 500 may be or include a computer (such as a desktop, notebook, tablet, or handheld computer, a server), a cloud computing system or service, or some other type of device or system or combination of devices and/or systems. It should be understood that elements of system 500 may represent a physical instrument and/or computing device such as a server, a particular physical hardware platform on which applications operate in software, or other combinations of hardware and software that are configured to carry out functions as described herein.

As shown in FIG. 5, system 500 may include a communication interface 502, a user interface 504, one or more processors 506, and data storage 508, all of which may be communicatively linked together by a system bus, network, or other connection mechanism 510.

Communication interface 502 may function to allow system 500 to communicate, using analog or digital modulation of electric, magnetic, electromagnetic, optical, or other signals, with other devices (e.g., with systems providing a user interface via which text or other information can be provided to and/or received from individuals providing information about incidents that have occurred), access networks, and/or transport networks. Thus, communication interface 502 may facilitate circuit-switched and/or packet-switched communication, such as plain old telephone service (POTS) communication and/or Internet protocol (IP) or other packetized communication. For instance, communication interface 502 may include a chipset and antenna arranged for wireless communication with a radio access network or an access point. Also, communication interface 502 may take the form of or include a wireline interface, such as an Ethernet, Universal Serial Bus (USB), or High-Definition Multimedia Interface (HDMI) port. Communication interface 502 may also take the form of or include a wireless interface, such as a WiFi, BLUETOOTH®, global positioning system (GPS), or wide-area wireless interface (e.g., WiMAX, 3GPP Long-Term Evolution (LTE), or 3GPP 5G). However, other forms of physical layer interfaces and other types of standard or proprietary communication protocols may be used over communication interface 502. Furthermore, communication interface 502 may comprise multiple physical communication interfaces (e.g., a WiFi interface, a BLUETOOTH® interface, and a wide-area wireless interface).

User interface 504 may function to allow system 500 to interact with a user, for example to receive input from and/or to provide output to the user. Thus, user interface 504 may include input components such as a keypad, keyboard, touch-sensitive or presence-sensitive panel, computer mouse, trackball, joystick, microphone, and so on. User interface 504 may also include one or more output components such as a display screen which, for example, may be combined with a presence-sensitive panel. The display screen may be based on CRT, LCD, and/or LED technologies, or other technologies now known or later developed. User interface 504 may also be configured to generate audible output(s), via a speaker, speaker jack, audio output port, audio output device, earphones, and/or other similar devices.

Processor(s) 506 may comprise one or more general purpose processors—e.g., microprocessors—and/or one or more special purpose processors—e.g., digital signal processors (DSPs), graphics processing units (GPUs), floating point units (FPUs), network processors, tensor processing units (TPUs), or application-specific integrated circuits (ASICs). Data storage 508 may include one or more volatile and/or non-volatile storage components, such as magnetic, optical, flash, or organic storage, and may be integrated in whole or in part with processor(s) 506 and/or with some other element of the system. Data storage 508 may include removable and/or non-removable components.

Processor(s) 506 may be capable of executing program instructions 518 (e.g., compiled or non-compiled program logic and/or machine code) stored in data storage 508 to carry out the various functions described herein. Therefore, data storage 508 may include a non-transitory computer-readable medium, having stored thereon program instructions that, upon execution by system 500, cause system 500 to carry out any of the methods, processes, or functions disclosed in this specification and/or the accompanying drawings. The execution of program instructions 518 by processor(s) 506 may result in processor 506 using data 512.

By way of example, program instructions 518 may include an operating system 522 (e.g., an operating system kernel, device driver(s), and/or other modules) and one or more application programs 520 (e.g., functions for executing the methods described herein) installed on system 500. Data 512 may include stored training data 516 (e.g., stored chat logs) that can be used to train and/or update one or more models used as part of any of the methods described herein.

Application programs 520 may communicate with operating system 522 through one or more application programming interfaces (APIs). These APIs may facilitate, for instance, application programs 520 transmitting or receiving information via communication interface 502, receiving and/or displaying information on user interface 504, and so on.

Application programs 520 may take the form of "apps" that could be downloadable to system 500 through one or more online application stores or application markets (via, e.g., the communication interface 502). However, application programs can also be installed on system 500 in other ways, such as via a web browser or through a physical interface (e.g., a USB port) of the system 500.

III. EXAMPLE METHODS

Figure 6:
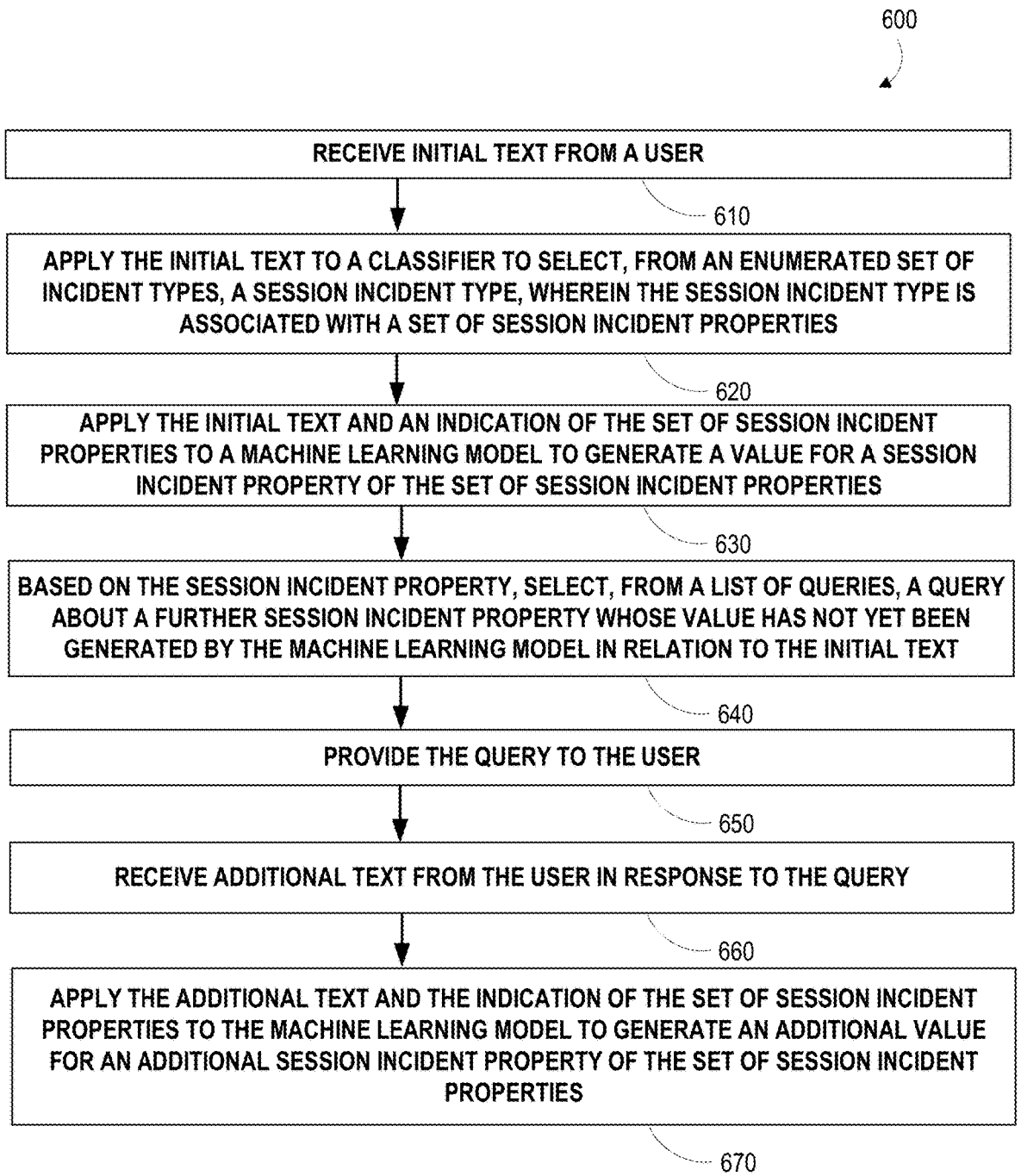
FIG. 6 depicts aspects of an example method.

FIG. 6 depicts an example method 600. The method 600 includes receiving initial text from a user (610). This can include: (i) indicating, to the user, a query about whether an incident is ongoing; (ii) responsively receiving, from the user, a response indicating that the incident is not ongoing; and (iii) responsive to receiving the response indicating that the incident is not ongoing, indicating, to the user, a prompt to describe the incident, wherein the initial text is received from the user in response to the prompt to describe the incident.

The method additionally includes applying the initial text to a classifier to select, from an enumerated set of incident types, a session incident type, wherein the session incident type is associated with a set of session incident properties (620). This could include (i) performing keyword matching between words of the initial text and sets of one or more keywords for each incident type in the enumerated set of incident types to determining that the initial text does not match any of the sets of one or more keywords for any of the enumerated set of incident types; and (ii) responsive to determining that the initial text does not match any of the sets of one or more keywords, applying the initial text to a machine learning text classification model to select, from an enumerated set of incident types, the session incident type. The enumerated set of incident types include suspicious activity, drugs or alcohol, harassment or abuse, theft or lost item, and mental health.

The method additionally includes applying the initial text and an indication of the set of session incident properties to a machine learning model to generate a value for a session incident property of the set of session incident properties (630). The machine learning model can be trained using chat logs that have been annotated to indicate portions of the chat logs that indicate values of incident properties and identities of the incident properties. The machine learning model can include a transformer.

The method additionally includes based on the session incident property, selecting, from a list of queries, a query about a further session incident property whose value has not yet been generated by the machine learning model in relation to the initial text (640).

The method additionally includes providing the query to the user (650).

The method additionally includes receiving additional text from the user in response to the query (660).

The method additionally includes applying the additional text and the indication of the set of session incident properties to the machine learning model to generate an additional value for an additional session incident property of the set of session incident properties (670).

The method 600 could include additional steps or features. For example, the method 600 could include, subsequent to applying the additional text and the indication of the set of session incident properties to the machine learning model, determining that values have been generated by the machine learning model in relation to text from the user for at least a threshold number of the set of session incident properties and responsively terminating a chat session with the user.

Figure 7:
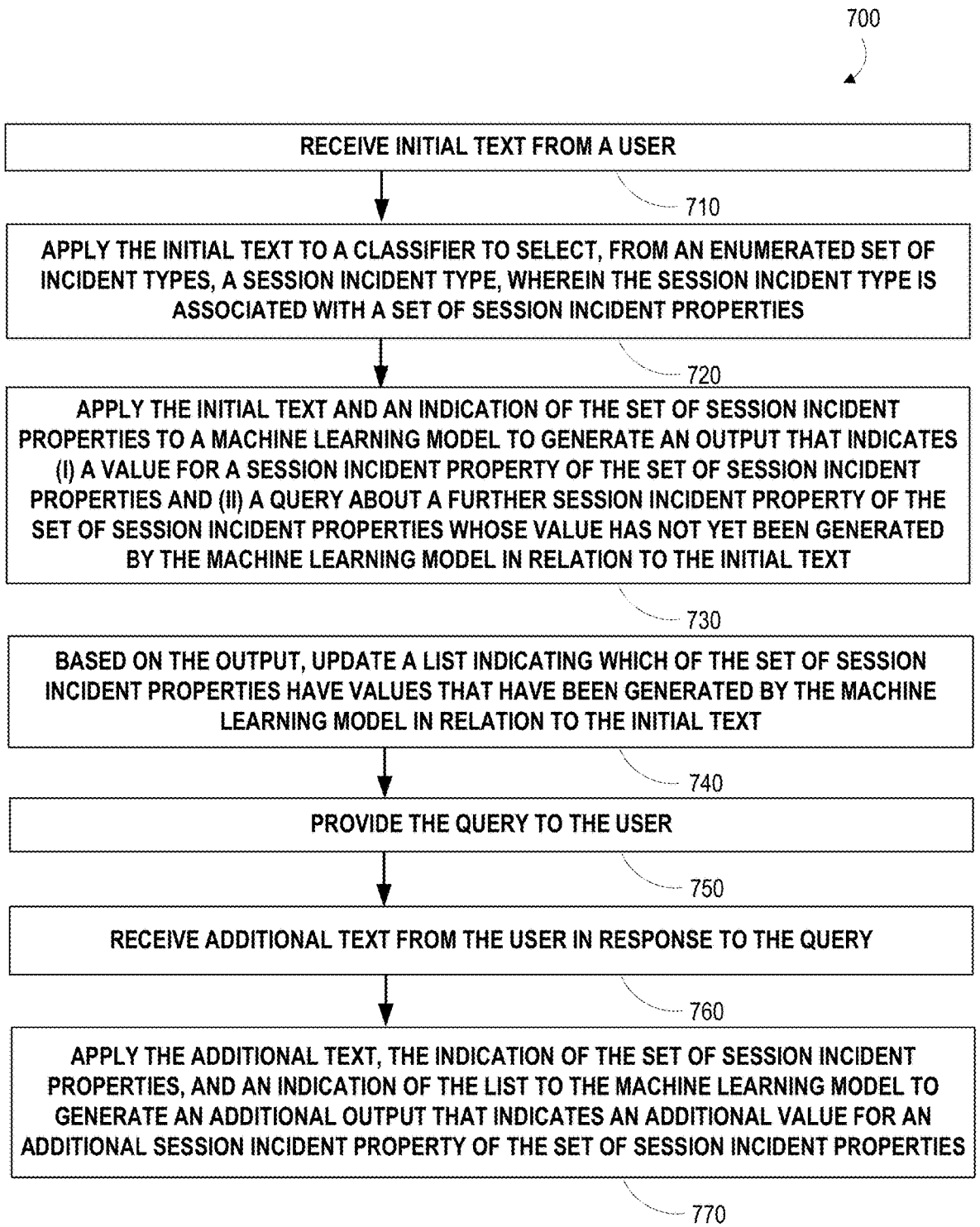
FIG. 7 depicts aspects of an example method.

FIG. 7 depicts an example method 700. The method 700 includes receiving initial text from a user (710). This can include: (i) indicating, to the user, a query about whether an incident is ongoing; (ii) responsively receiving, from the user, a response indicating that the incident is not ongoing; and (iii) responsive to receiving the response indicating that the incident is not ongoing, indicating, to the user, a prompt to describe the incident, wherein the initial text is received from the user in response to the prompt to describe the incident.

The method 700 additionally includes applying the initial text to a classifier to select, from an enumerated set of incident types, a session incident type, wherein the session incident type is associated with a set of session incident properties (720). This could include (i) performing keyword matching between words of the initial text and sets of one or more keywords for each incident type in the enumerated set of incident types to determining that the initial text does not match any of the sets of one or more keywords for any of the enumerated set of incident types; and (ii) responsive to determining that the initial text does not match any of the sets of one or more keywords, applying the initial text to a machine learning text classification model to select, from an enumerated set of incident types, the session incident type. The enumerated set of incident types include suspicious activity, drugs or alcohol, harassment or abuse, theft or lost item, and mental health. The enumerated set of incident types include suspicious activity, drugs or alcohol, harassment or abuse, theft or lost item, and mental health.

The method 700 additionally includes applying the initial text and an indication of the set of session incident properties to a machine learning model to generate an output that indicates (i) a value for a session incident property of the set of session incident properties and (ii) a query about a further session incident property of the set of session incident properties whose value has not yet been generated by the machine learning model in relation to the initial text (730). The machine learning model can have been trained using chat logs that have been annotated to indicate portions of the chat logs that indicate values of incident properties and identities of the incident properties. Additionally or alternatively, the machine learning model can have been trained using non-annotated chat logs to predict dispatcher responses to user text based on sets of prior user text and dispatcher queries. Additionally or alternatively, the machine learning model can have been trained using chat logs that have been augmented by applying the chat logs to a generative machine learning language model to generate therefrom simulated chat logs that exhibit increased emotional support. The machine learning model can include a large language model.

The method 700 additionally includes, based on the output, updating a list indicating which of the set of session incident properties have values that have been generated by the machine learning model in relation to the initial text (740).

The method 700 additionally includes providing the query to the user (750).

The method 700 additionally includes receiving additional text from the user in response to the query (760).

The method 700 additionally includes applying the additional text, the indication of the set of session incident properties, and an indication of the list to the machine learning model to generate an additional output that indicates an additional value for an additional session incident property of the set of session incident properties (770).

The method 700 could include additional steps or features. For example, the method 700 could include, subsequent to applying the additional text, the indication of the set of session incident properties, and the representation of the list to the machine learning model, determining that values have been generated by the machine learning model in relation to text from the user for at least a threshold number of the set of session incident properties and responsively terminating a chat session with the user. In another example, the method 700 could include determining, based on the initial text and the additional text, a user emotional state, wherein applying the additional text, the indication of the set of session incident properties, and the representation of the list to the machine learning model to generate the additional output comprises applying the additional text, the indication of the set of session incident properties, the representation of the list to the machine learning model, and an indication of the user emotional state to generate the additional output. Determining the user emotional state based on the initial text and the additional text could include applying the initial text and the additional text to a sentiment prediction model. In such examples, the machine learning model could have been trained using chat logs that have been augmented by applying the sentiment prediction model thereto to annotate user text in the chat logs with user emotional state information predicted from the user text.

In some examples, receiving the initial text (710), applying the initial text to a classifier (720), providing the query to the user (750), and receiving the additional text (760) are performed by a first computational system; in such examples, applying the initial text and the indication of the set of session incident properties to the machine learning model can include: (i) transmitting, from the first computational system to a second computational system that is remote from the first computational system, an indication of the initial text and the set of session incident properties; (ii) applying, by the second computational system, the initial text and the indication of the set of session incident properties to the machine learning model to generate the output; and (iii) transmitting, from the second computational system to the first computational system, an indication of the output.

It should be understood that arrangements described herein are for purposes of example only. As such, those skilled in the art will appreciate that other arrangements and other elements (e.g. machines, interfaces, operations, orders, and groupings of operations, etc.) can be used instead of or in addition to the illustrated elements or arrangements.

V. CONCLUSION

It should be understood that arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

We claim:

1. A method comprising:
receiving initial text from a user;
applying the initial text to a classifier to select, from an enumerated set of incident types, a session incident type, wherein the session incident type is associated with a set of session incident properties;
applying the initial text and an indication of the set of session incident properties to a machine learning model to generate a value for a session incident property of the set of session incident properties;
based on the session incident property, selecting, from a list of queries, a query about a further session incident property whose value has not yet been generated by the machine learning model in relation to the initial text;
providing the query to the user;
receiving additional text from the user in response to the query; and
applying the additional text and the indication of the set of session incident properties to the machine learning model to generate an additional value for an additional session incident property of the set of session incident properties.

2. The method of claim 1, wherein applying the initial text to the classifier comprises:
performing keyword matching between words of the initial text and sets of one or more keywords for each incident type in the enumerated set of incident types to determining that the initial text does not match any of the sets of one or more keywords for any of the enumerated set of incident types; and
responsive to determining that the initial text does not match any of the sets of one or more keywords, applying the initial text to a machine learning text classification model to select, from an enumerated set of incident types, the session incident type.

3. The method of claim 1, wherein enumerated set of incident types include suspicious activity, drugs or alcohol, harassment or abuse, theft or lost item, and mental health.

4. The method of claim 1, further comprising:
subsequent to applying the additional text and the indication of the set of session incident properties to the machine learning model, determining that values have been generated by the machine learning model in relation to text from the user for at least a threshold number of the set of session incident properties and responsively terminating a chat session with the user.

5. The method of claim 1, wherein the machine learning model has been trained using chat logs that have been annotated to indicate portions of the chat logs that indicate values of incident properties and identities of the incident properties.

6. The method of claim 1, wherein receiving initial text from a user comprises:
indicating, to the user, a query about whether an incident is ongoing;
responsively receiving, from the user, a response indicating that the incident is not ongoing; and
responsive to receiving the response indicating that the incident is not ongoing, indicating, to the user, a prompt to describe the incident, wherein the initial text is received from the user in response to the prompt to describe the incident.

7. The method of claim 1, wherein the machine learning model comprises a transformer.

8. A method comprising:
receiving initial text from a user;
applying the initial text to a classifier to select, from an enumerated set of incident types, a session incident type, wherein the session incident type is associated with a set of session incident properties;
applying the initial text and an indication of the set of session incident properties to a machine learning model to generate an output that indicates (i) a value for a session incident property of the set of session incident properties and (ii) a query about a further session incident property of the set of session incident properties whose value has not yet been generated by the machine learning model in relation to the initial text;
based on the output, updating a list indicating which of the set of session incident properties have values that have been generated by the machine learning model in relation to the initial text;
providing the query to the user;
receiving additional text from the user in response to the query; and
applying the additional text, the indication of the set of session incident properties, and an representation of the list to the machine learning model to generate an additional output that indicates an additional value for an additional session incident property of the set of session incident properties.

9. The method of claim 8, wherein applying the initial text to the classifier comprises:
performing keyword matching between words of the initial text and sets of one or more keywords for each incident type in the enumerated set of incident types to determining that the initial text does not match any of the sets of one or more keywords for any of the enumerated set of incident types; and
responsive to determining that the initial text does not match any of the sets of one or more keywords, applying the initial text to a machine learning text classification model to select, from an enumerated set of incident types, the session incident type.

10. The method of claim 8, wherein enumerated set of incident types include suspicious activity, drugs or alcohol, harassment or abuse, theft or lost item, and mental health.

11. The method of claim 8, further comprising:
subsequent to applying the additional text, the indication of the set of session incident properties, and the representation of the list to the machine learning model, determining that values have been generated by the machine learning model in relation to text from the user for at least a threshold number of the set of session incident properties and responsively terminating a chat session with the user.

12. The method of claim 8, wherein the machine learning model has been trained using chat logs that have been annotated to indicate portions of the chat logs that indicate values of incident properties and identities of the incident properties.

13. The method of claim 8, wherein the machine learning model has been trained using non-annotated chat logs to predict dispatcher responses to user text based on sets of prior user text and dispatcher queries.

14. The method of claim 8, wherein receiving initial text from a user comprises:
indicating, to the user, a query about whether an incident is ongoing;
responsively receiving, from the user, a response indicating that the incident is not ongoing; and
responsive to receiving the response indicating that the incident is not ongoing, indicating, to the user, a prompt to describe the incident, wherein the initial text is received from the user in response to the prompt to describe the incident.

15. The method of claim 8, further comprising:
determining, based on the initial text and the additional text, a user emotional state, wherein applying the additional text, the indication of the set of session incident properties, and the representation of the list to the machine learning model to generate the additional output comprises applying the additional text, the indication of the set of session incident properties, the representation of the list to the machine learning model, and an indication of the user emotional state to generate the additional output.

16. The method of claim 15, wherein determining the user emotional state based on the initial text and the additional text comprises applying the initial text and the additional text to a sentiment prediction model.

17. The method of claim 16, wherein the machine learning model has been trained using chat logs that have been augmented by applying the sentiment prediction model thereto to annotate user text in the chat logs with user emotional state information predicted from the user text.

18. The method of claim 8, wherein the machine learning model has been trained using chat logs that have been augmented by applying the chat logs to a generative machine learning language model to generate therefrom simulated chat logs that exhibit increased emotional support.

19. The method of claim 8, wherein receiving the initial text, applying the initial text to a classifier, providing the query to the user, and receiving the additional text are performed by a first computational system, and wherein applying the initial text and the indication of the set of session incident properties to the machine learning model comprises:
transmitting, from the first computational system to a second computational system that is remote from the first computational system, an indication of the initial text and the set of session incident properties;
applying, by the second computational system, the initial text and the indication of the set of session incident properties to the machine learning model to generate the output; and
transmitting, from the second computational system to the first computational system, an indication of the output.

20. The method of claim 8, wherein the machine learning model comprises a large language model.

\* \* \* \* \*